US011874055B2

(12) United States Patent
Davies et al.

(10) Patent No.: US 11,874,055 B2
(45) Date of Patent: Jan. 16, 2024

(54) REFRIGERANT SUPPLY TO A COOLING FACILITY

(71) Applicant: CONOCOPHILLIPS COMPANY, Houston, TX (US)

(72) Inventors: Paul R. Davies, Houston, TX (US); James L Harris, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 0 days.

(21) Appl. No.: 14/625,022

(22) Filed: Feb. 18, 2015

(65) Prior Publication Data

US 2015/0253070 A1 Sep. 10, 2015

Related U.S. Application Data

(60) Provisional application No. 61/947,626, filed on Mar. 4, 2014.

(51) Int. Cl.

*F25B 45/00* (2006.01)
*F17C 7/02* (2006.01)
(Continued)

(52) U.S. Cl.

CPC ............... *F25J 1/0022* (2013.01); *F17C 7/02* (2013.01); *F25B 45/00* (2013.01); *F25J 1/004* (2013.01);
(Continued)

(58) Field of Classification Search

CPC .......... F25J 1/0249; F25J 1/025; F25J 1/0085; F25J 1/0087; F25J 1/0209; F25J 1/021; F25B 45/00; F25B 2345/001
See application file for complete search history.

(56) References Cited

U.S. PATENT DOCUMENTS 3,101,861 A * 8/1963 Mearns .................. B63B 25/16
62/53.2
3,303,661 A * 2/1967 Karbosky ................ F17B 1/12
62/50.1
(Continued)

FOREIGN PATENT DOCUMENTS

EP 1895254 A1 * 3/2008 ............ F25J 1/0022
EP 2466235 A1 6/2012
WO 2011142675 11/2011

OTHER PUBLICATIONS

International Search Report. PCT/US2015/016484, dated May 22, 2015.

*Primary Examiner* — John F Pettitt, III
(74) *Attorney, Agent, or Firm* — Polsinelli PC

(57) ABSTRACT

An embodiment of a method for supplying refrigerants to a liquefied natural gas (LNG) facility includes: advancing a first refrigerant from a first storage device to a heat exchanger, the first refrigerant having a first temperature; advancing a second refrigerant from a second storage device to the heat exchanger, the second refrigerant having a second temperature different than the first temperature; flowing the first refrigerant and the second refrigerant through the heat exchanger; adjusting the second temperature based on at least a transfer of heat between the first refrigerant and the second refrigerant in the heat exchanger; and transferring the first refrigerant and the second refrigerant to the LNG facility.

19 Claims, 11 Drawing Sheets

(51) Int. Cl.
*F25J 1/00* (2006.01)
*F25J 1/02* (2006.01)

(52) U.S. Cl.
CPC ........... *F25J 1/0052* (2013.01); *F25J 1/0085* (2013.01); *F25J 1/0087* (2013.01); *F25J 1/021* (2013.01); *F25J 1/023* (2013.01); *F25J 1/0249* (2013.01); *F25J 1/0283* (2013.01); *F25J 2220/62* (2013.01); *F25J 2220/64* (2013.01)

(56) References Cited

U.S. PATENT DOCUMENTS

| | | | | | |
|---|---|---|---|---|---|
| 3,602,002 | A * | 8/1971 | Bailey | F25B 45/00 | 62/48.2 |
| 3,808,826 | A * | 5/1974 | Harper | C07C 7/005 | 62/612 |
| 4,217,848 | A * | 8/1980 | Meyer-Haake | B63B 9/065 | 114/264 |
| 4,504,296 | A | 3/1985 | Newton et al. | | |
| 5,611,216 | A * | 3/1997 | Low | F25J 1/0052 | 62/612 |
| 5,718,119 | A * | 2/1998 | Wakita | F25B 45/00 | 62/303 |
| 5,791,160 | A | 8/1998 | Mandler et al. | | |
| 5,878,814 | A * | 3/1999 | Breivik | B63B 22/021 | 166/267 |
| 6,530,240 | B1 | 3/2003 | Kountz et al. | | |
| 7,478,975 | B2 | 1/2009 | Hubbard et al. | | |
| 7,721,557 | B1 * | 5/2010 | Stearns | F17C 7/02 | 62/48.2 |
| 9,683,702 | B2 * | 6/2017 | Chang | F17C 7/02 | |
| 10,060,674 | B2 * | 8/2018 | Hodges | F25J 3/061 | |
| 2010/0147024 | A1 | 6/2010 | Roberts et al. | | |
| 2010/0293996 | A1 | 11/2010 | Van Aken et al. | | |
| 2011/0168377 | A1 | 7/2011 | Alers et al. | | |
| 2012/0118007 | A1 | 5/2012 | Qualls | | |
| 2017/0030523 | A1 * | 2/2017 | Emilsen | F17C 7/02 | |

* cited by examiner

400

REFRIGERANT SUPPLY TO A COOLING FACILITY

CROSS-REFERENCE TO RELATED APPLICATIONS

This application is a non-provisional application which claims the benefit of and priority to U.S. Provisional Application Ser. No. 61/947,626 filed Mar. 4, 2014, entitled "REFRIGERANT SUPPLY TO A COOLING FACILITY," which is hereby incorporated by reference in its entirety.

FIELD OF THE INVENTION

This invention relates to liquefaction of natural gas, and in particular, to systems and methods for supplying refrigerants to a liquefied natural facility.

BACKGROUND OF THE INVENTION

Transporting natural gas in its liquefied form can effectively link a natural gas source with a distant market when the source and market are not connected by a pipeline. This situation commonly arises when the source of natural gas and the market for the natural gas are separated by large bodies of water. In such cases, liquefied natural gas (LNG) can be transported from the source to the market using specially designed ocean-going LNG tankers.

Typically, a supply of refrigerant is supplied to a LNG facility from pressurized tanks High pressure storage presents numerous safety issues, which can present challenges, e.g., in locating such storage in on-shore facilities with plot space constraints and offshore facilities where space is limited.

SUMMARY OF THE INVENTION

An embodiment of a method for supplying refrigerants to a liquefied natural gas (LNG) facility includes: advancing a first refrigerant from a first storage device to a heat exchanger, the first refrigerant having a first temperature; advancing a second refrigerant from a second storage device to the heat exchanger, the second refrigerant having a second temperature different than the first temperature; flowing the first refrigerant and the second refrigerant through the heat exchanger; adjusting the second temperature based on at least a transfer of heat between the first refrigerant and the second refrigerant in the heat exchanger; and transferring the first refrigerant and the second refrigerant to the LNG facility.

An embodiment of a system for supplying refrigerants to a liquefied natural gas (LNG) facility includes: a first conduit in fluid communication with a first storage device configured to store a first refrigerant, the first refrigerant having a first temperature; a second conduit in fluid communication with a second storage device configured to store a second refrigerant, the second refrigerant having a second temperature different than the first temperature; a heat exchanger configured to receive the first refrigerant from the first conduit and receive the second refrigerant from the second conduit, the heat exchanger configured to transfer heat between the first refrigerant and the second refrigerant; a first flow path configured to advance the first refrigerant to the LNG facility; and a second flow path configured to advance the second refrigerant to the LNG facility.

An embodiment of a system for transferring liquid refrigerant to an offshore liquefied natural gas (LNG) facility includes: a storage device configured to store a refrigerant in liquid form at a storage pressure that is lower than an operating pressure of the LNG facility; a flow assembly configured to advance the refrigerant from the storage device to a cooling unit of the LNG and pressurize the refrigerant to the operating pressure; and a temperature control assembly in fluid communication with the flow assembly, the temperature control assembly configured to adjust the temperature of the refrigerant that is delivered to the cooling unit.

An embodiment of a method for supplying refrigerants to a liquefied natural gas (LNG) facility includes: advancing a first refrigerant from a first storage device to a first pumping device, the first refrigerant having a first boiling point, the first refrigerant stored in the first storage device at about atmospheric pressure and at a first temperature; pressurizing the first refrigerant by the first pumping device, and advancing the pressurized first refrigerant to a heat exchanger; advancing a second refrigerant from a second storage device to a second pumping device, the second refrigerant having a second boiling point that is lower than the first boiling point, the second refrigerant stored in the second storage device at about atmospheric pressure and at a second temperature that is lower than the first temperature; pressurizing the second refrigerant by the second pumping device, and advancing the pressurized second refrigerant to the heat exchanger; flowing the pressurized first refrigerant and the pressurized second refrigerant through the heat exchanger; heating the pressurized second refrigerant to a selected temperature based on a transfer of heat from the first refrigerant to the second refrigerant in the heat exchanger; transferring the heated, pressurized second refrigerant to a second cooling cycle in the LNG facility via a pressure control device to introduce the heated, pressurized second refrigerant to the second cooling cycle at a temperature and a pressure that are within cooling cycle equipment limitations and that avoid thermal damage and other damage to cooling cycle equipment; advancing the pressurized first refrigerant to a temperature control device and heating the pressurized first refrigerant, the temperature control device including a heat exchanger in thermal communication with a closed-loop heating cycle configured to heat the pressurized first refrigerant to a temperature suitable for introduction to a first cooling cycle in the LNG facility; and transferring the heated, pressurized first refrigerant from the temperature control device to the first cooling cycle in the LNG facility via a pressure control device and introducing the heated, pressurized first refrigerant to the first cooling cycle at a temperature and a pressure that are within cooling cycle equipment limitations and that avoid thermal damage and other damage to cooling cycle equipment.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION

Figure 1:
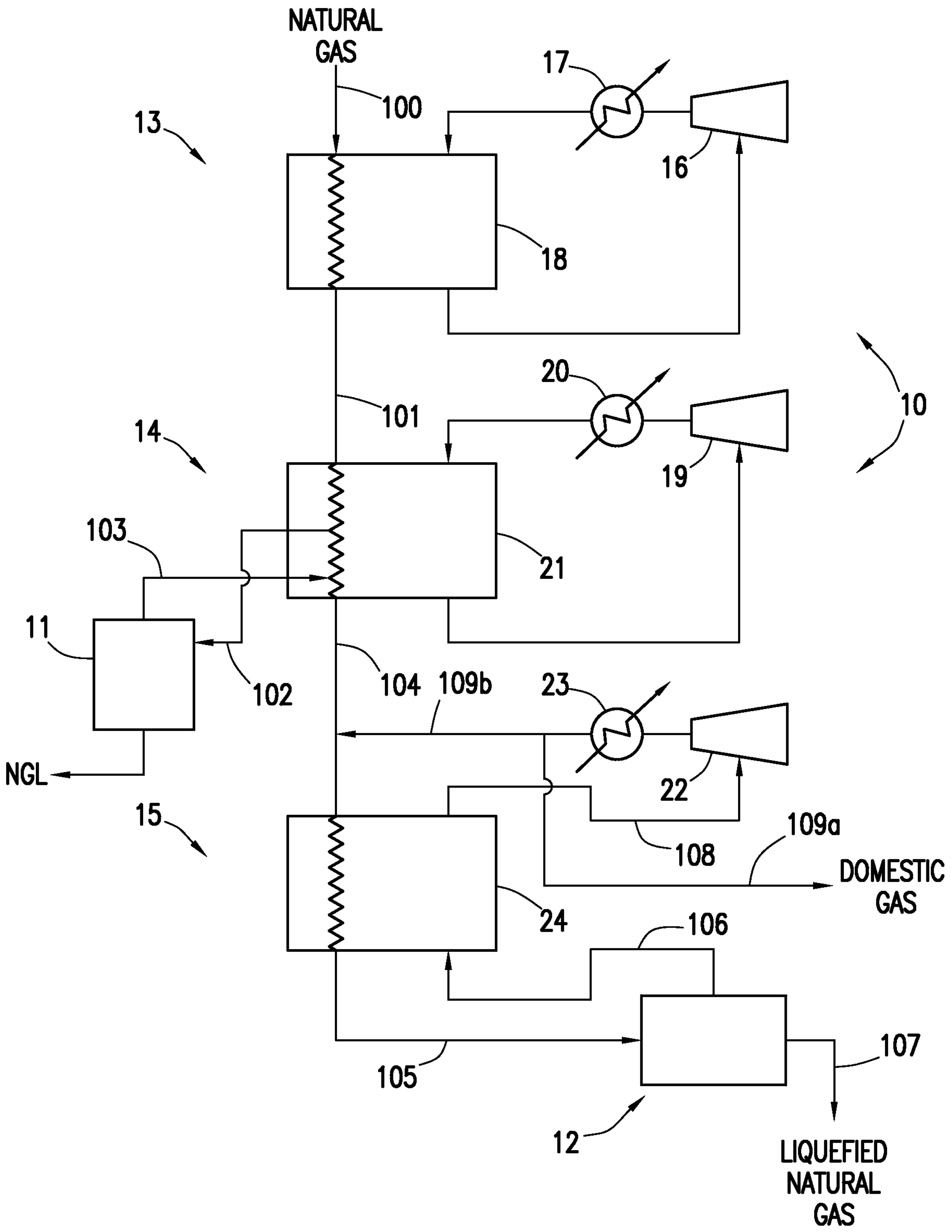
FIG. 1 is a simplified overview of an embodiment of a cascade-type LNG facility.

Embodiments of systems, apparatuses and methods are described herein for filling components of a cooling system or facility, such as a liquefied natural gas (LNG) production facility, with refrigerant fluids. Such embodiments allow for transferring liquid refrigerants to an LNG facility from low pressure (i.e., lower than refrigerant pressure in the LNG facility during operation) storage and controlling the temperature of the refrigerant during transfer, e.g., to avoid thermal shock due to introduction of the refrigerants to the LNG facility. For example, refrigerants are transmitted or transferred from refrigerant storage tanks that store refrigerants at about atmospheric pressure.

Embodiments described herein are configured for use with any land based or offshore processing facility that requires transfer of refrigerants. The embodiments are useful for floating applications where pressurized refrigerant storage is difficult to locate for safety reasons, and are also useful for onshore plants where plot space constraints make pressurized storage difficult. For example, refrigerant supply systems described herein may be disposed on a LNG carrier ship or vessel that includes various treatment systems or components. Exemplary treatment systems include a natural gas pumping and receiving system, a pre-treatment system (e.g., mercury, acid gas and water removal), a natural gas liquefaction system and refrigerant storage and supply systems.

In one embodiment, a supply system coupled to an LNG facility is configured to supply at least two refrigerants having different boiling points. An exemplary supply system is coupled to a source of a first liquid refrigerant having a first boiling point (e.g., propane) and a source of a second liquid refrigerant having a second lower boiling point (e.g., ethylene). The system includes a heat exchanger or other device configured to transfer heat between the refrigerants, e.g., from the first refrigerant to the second refrigerant to increase the temperature of the second refrigerant to a desired level. The heat transfer is controlled to control the temperature of the second refrigerant, and may also be used to control the first refrigerant temperature, to raise or otherwise control the temperature of the second refrigerant that is introduced to a cooling unit in the LNG facility. In one embodiment, a temperature control assembly is included to control the temperature of the first refrigerant as the first refrigerant is transferred from the heat exchanger to a cooling unit in the LNG facility.

An example of the supply system includes a cascade configuration that uses a relatively warm refrigerant such as propane to heat a colder refrigerant such as ethylene, and a heating fluid (e.g., glycol) or other source of heat to raise the temperature of the warm refrigerant. The heating fluid may be heated by any suitable heat source, such as hot water heated by gas turbine waste heat.

Embodiments of methods include transferring the refrigerants at an initial stage (i.e., first filling) to fill the cooling units, and transferring the refrigerants during operation of the facility or otherwise after the first fill (i.e., online filling). Examples of such methods include first fill procedures that include transferring gaseous and/or liquid refrigerants to a LNG facility, and online filling procedures that include transferring liquid refrigerants to the LNG facility.

The systems and methods described herein, although described in the context of a LNG facility, are not so limited and may be used for filling any cooling facility that utilizes gas refrigerants and/or liquid refrigerants. For example, embodiments described herein can be implemented in various LNG facilities or other cooling facilities. LNG facilities generally employ one or more refrigerants to extract heat from the natural gas and reject to the environment. Numerous configurations of LNG systems exist and the embodiments described herein may be implemented in many different types of LNG systems.

In one embodiment, refrigerant supply as described herein can be implemented in a mixed refrigerant LNG system. Examples of mixed refrigerant processes can include, but are not limited to, a single refrigeration system using a mixed refrigerant, a propane pre-cooled mixed refrigerant system, and a dual mixed refrigerant system.

In another embodiment, the systems, apparatuses and methods are implemented in conjunction with or as a part of a cascade LNG system employing a cascade-type refrigeration process using one or more predominately pure component refrigerants. The refrigerants utilized in cascade-type refrigeration processes can have successively lower boiling points in order to facilitate heat removal from the natural gas stream being liquefied. In addition to cooling the natural gas stream through indirect heat exchange with one or more refrigerants, cascade and mixed-refrigerant LNG systems can employ one or more expansion cooling stages to simultaneously cool the LNG while reducing its pressure.

FIG. 1 illustrates one embodiment of a simplified LNG facility capable of simultaneously producing LNG and a domestic gas product. The cascade-type LNG facility of FIG. 1 generally comprises a cascade cooling section 10, a heavies removal zone 11, and an expansion cooling section 12. Cascade cooling section 10 is depicted as comprising a first mechanical refrigeration cycle 13, a second mechanical refrigeration cycle 14, and a third mechanical refrigeration cycle 15. In general, first, second, and third refrigeration cycles 13, 14, 15 can be closed-loop refrigeration cycles, open-loop refrigeration cycles, or any combination thereof. In one embodiment of the present invention, first and second refrigeration cycles 13 and 14 can be closed-loop cycles, and third refrigeration cycle 15 can be an open-loop cycle that utilizes a refrigerant comprising at least a portion of the natural gas feed stream undergoing liquefaction.

In one embodiment, first, second, and third refrigeration cycles 13, 14, 15 can employ respective first, second, and third refrigerants having successively lower boiling points. For example, the first, second, and third refrigerants can have mid-range boiling points at standard pressure (i.e., mid-range standard boiling points) within about 20° F., within about 10° F., or within 5° F. of the standard boiling points of propane, ethylene, and methane, respectively. In one embodiment, the first refrigerant can comprise at least about 75 mole percent, at least about 90 mole percent, at least 95 mole percent, or can consist essentially of propane, propylene, or mixtures thereof. The second refrigerant can comprise at least about 75 mole percent, at least about 90 mole percent, at least 95 mole percent, or can consist essentially of ethane, ethylene, or mixtures thereof. The third refrigerant can comprise at least about 75 mole percent, at least about 90 mole percent, at least 95 mole percent, or can consist essentially of methane.

As shown in FIG. 1, first refrigeration cycle 13 can comprise a first refrigerant compressor 16, a first cooler 17, and a first refrigerant chiller 18. First refrigerant compressor 16 can discharge a stream of compressed first refrigerant, which can subsequently be cooled and at least partially liquefied in cooler 17. The resulting refrigerant stream can then enter first refrigerant chiller 18, wherein at least a portion of the refrigerant stream can cool the incoming natural gas stream in conduit 100 via indirect heat exchange with the vaporizing first refrigerant. The gaseous refrigerant can exit first refrigerant chiller 18 and can then be routed to an inlet port of first refrigerant compressor 16 to be recirculated as previously described.

First refrigerant chiller 18 can comprise one or more cooling stages operable to reduce the temperature of the incoming natural gas stream in conduit 100 by about 40 to about 210° F., about 50 to about 190° F., or 75 to 150° F. Typically, the natural gas entering first refrigerant chiller 18 via conduit 100 can have a temperature in the range of from about 0 to about 200° F., about 20 to about 180° F., or 50 to 165° F., while the temperature of the cooled natural gas stream exiting first refrigerant chiller 18 can be in the range of from about −65 to about 0° F., about −50 to about −10° F., or −35 to −15° F. In general, the pressure of the natural gas stream in conduit 100 can be in the range of from about 100 to about 3,000 pounds per square inch absolute (psia), about 250 to about 1,000 psia, or 400 to 800 psia. Because the pressure drop across first refrigerant chiller 18 can be less than about 100 psi, less than about 50 psi, or less than 25 psi, the cooled natural gas stream in conduit 101 can have substantially the same pressure as the natural gas stream in conduit 100.

As illustrated in FIG. 1, the cooled natural gas stream (also referred to herein as the "cooled predominantly methane stream") exiting first refrigeration cycle 13 can then enter second refrigeration cycle 14, which can comprise a second refrigerant compressor 19, a second cooler 20, and a second refrigerant chiller 21. Compressed refrigerant can be discharged from second refrigerant compressor 19 and can subsequently be cooled and at least partially liquefied in cooler 20 prior to entering second refrigerant chiller 21. Second refrigerant chiller 21 can employ a plurality of cooling stages to progressively reduce the temperature of the predominantly methane stream in conduit 101 by about 50 to about 180° F., about 65 to about 150° F., or 95 to 125° F. via indirect heat exchange with the vaporizing second refrigerant. As shown in FIG. 1, the vaporized second refrigerant can then be returned to an inlet port of second refrigerant compressor 19 prior to being recirculated in second refrigeration cycle 14, as previously described.

The natural gas feed stream in conduit 100 will usually contain ethane and heavier components ($C_2$+), which can result in the formation of a $C_2$+ rich liquid phase in one or more of the cooling stages of second refrigeration cycle 14. In order to remove the undesired heavies material from the predominantly methane stream prior to complete liquefaction, at least a portion of the natural gas stream passing through second refrigerant chiller 21 can be withdrawn via conduit 102 and processed in heavies removal zone 11, as shown in FIG. 1. The natural gas stream in conduit 102 can have a temperature in the range of from about −160 to about −50° F., about −140 to about −65° F., or to −85° F. and a pressure that is within about 5 percent, about 10 percent, or 15 percent of the pressure of the natural gas feed stream in conduit 100.

As shown in FIG. 1, the stream exiting heavies removal zone 11 via conduit 103 can subsequently be routed back to second refrigeration cycle 14, wherein the stream can be further cooled via second refrigerant chiller 21. In one embodiment, the stream exiting second refrigerant chiller 21 via conduit 104 can be completely liquefied and can have a temperature in the range of from about −205 to about −70° F., about −175 to about −95° F., or −140 to −125° F. Generally, the stream in conduit 104 can be at approximately the same pressure the natural gas stream entering the LNG facility in conduit 100.

As illustrated in FIG. 1, the pressurized LNG-bearing stream in conduit 104 enters third refrigeration cycle 15, which is depicted as generally comprising a third refrigerant compressor 22, a cooler 23, and a third refrigerant chiller 24. Compressed refrigerant discharged from third refrigerant compressor 22 enters cooler 23, wherein the refrigerant stream is cooled and at least partially liquefied prior to entering third refrigerant chiller 24. Third refrigerant chiller 24 can comprise one or more cooling stages operable to subcool the pressurized predominantly methane stream via indirect heat exchange with the vaporizing refrigerant. In one embodiment, the temperature of the pressurized LNG-bearing stream can be reduced by about 2 to about 60° F., about 5 to about 50° F., or 10 to 40° F. in third refrigerant chiller 24. In general, the temperature of the pressurized LNG-bearing stream exiting third refrigerant chiller 24 via conduit 105 can be in the range of from about −275 to about −75° F., about −225 to about −100° F., or −200 to −125° F.

As shown in FIG. 1, the pressurized LNG-bearing stream in conduit 105 can be then routed to expansion cooling section 12, wherein the stream is sub-cooled via sequential pressure reduction to near atmospheric pressure by passage through one or more expansion stages. In one embodiment, each expansion stage can reduce the temperature of the LNG-bearing stream by about 10 to about 60° F., about 15 to about 50° F., or 20 to 40° F. Each expansion stage comprises one or more expanders, which reduce the pressure of the liquefied stream to thereby evaporate or flash a portion thereof. Examples of suitable expanders can include, but are not limited to, Joule-Thompson valves, venturi nozzles, and turboexpanders. Expansion section 12 can employ any number of expansion stages and one or more expansion stages may be integrated with one or more cooling stages of third refrigerant chiller 24. In one embodiment of the present invention, expansion section 12 can reduce the pressure of the LNG-bearing stream in conduit 105 by about 75 to about 450 psi, about 125 to about 300 psi, or 150 to 225 psi.

Each expansion stage may additionally employ one or more vapor-liquid separators operable to separate the vapor phase (i.e., the flash gas stream) from the cooled liquid stream. As previously discussed, third refrigeration cycle 15 can comprise an open-loop refrigeration cycle, closed-loop refrigeration cycle, or any combination thereof. When third refrigeration cycle 15 comprises a closed-loop refrigeration cycle, the flash gas stream can be used as fuel within the facility or routed downstream for storage, further processing, and/or disposal. When third refrigeration cycle 15 comprises an open-loop refrigeration cycle, at least a portion of the flash gas stream exiting expansion section 12 can be used as a refrigerant to cool at least a portion of the natural gas stream in conduit 104. Generally, when third refrigerant cycle 15 comprises an open-loop cycle, the third refrigerant can comprise at least 50 weight percent, at least about 75 weight percent, or at least 90 weight percent of flash gas from expansion section 12, based on the total weight of the stream. As illustrated in FIG. 1, the flash gas exiting expansion section 12 via conduit 106 can enter third refrigerant chiller 24, wherein the stream can cool at least a portion of the natural gas stream entering third refrigerant chiller 24 via conduit 104. The resulting warmed refrigerant stream can then exit third refrigerant chiller 24 via conduit 108 and can thereafter be routed to an inlet port of third refrigerant compressor 22.

As shown in FIG. 1, third refrigerant compressor 22 discharges a stream of compressed third refrigerant, which is thereafter cooled in cooler 23. The cooled refrigerant stream can then be split into two portions. The first portion in conduit 109*a* can comprise the domestic gas product stream and can subsequently be routed to a location external to the LNG facility depicted in FIG. 1. The second portion of cooled refrigerant in conduit 109*b* can combine with the natural gas stream in conduit 104 prior to re-entering third refrigerant chiller 24, as previously discussed.

As shown in FIG. 1, the liquid stream exiting expansion section 12 via conduit 107 comprises LNG. In one embodiment, the LNG in conduit 107 can have a temperature in the range of from about −200 to about −300° F., about −225 to about −275° F., or −240 to −260° F. and a pressure in the range of from about 0 to about 40 psia, about 5 to about 25 psia, or 10 to 20 psia. The LNG in conduit 107 can subsequently be routed to storage and/or shipped to another location via pipeline, ocean-going vessel, truck, or any other suitable transportation means. In one embodiment, at least a portion of the LNG can be subsequently vaporized for uses in applications requiring vapor-phase natural gas.

In addition to producing LNG in conduit 107, the LNG facility depicted in FIG. 1 can also produce a domestic gas product in conduit 109*a*. As shown in FIG. 1, the domestic gas product can be withdrawn from an intermediate stream within the LNG facility, typically at a location downstream of heavies removal zone 95. Because the domestic gas stream can be withdrawn downstream of heavies removal zone 95, the domestic gas product can have a concentration of $C_6$+ material that is less than about 1 weight percent, less than about 0.5 weight percent, less than about 0.1 weight percent, or less than 0.01 weight percent, based on the total weight of the domestic gas stream. As a result, the domestic gas product withdrawn from the LNG facility of FIG. 1 via conduit 109*a* can comply with most or all of the local natural gas pipeline product specifications, including, for example, hydrocarbon dew point, with little or no additional processing.

In one embodiment shown in FIG. 1, the domestic gas product stream can be withdrawn from the compressed third refrigerant stream exiting third refrigerant compressor 22 via conduit 109*a*. Typically, the pressure of the domestic gas stream can be in the range of from about 15 to about 100 bar gauge (barg), about 25 to about 90 barg, or 35 to 75 barg. In order to produce a domestic gas product having a mass flow rate that is at least about 2 percent, at least about 5 percent, at least about 10 percent, or at least 25 percent of the mass flow rate of the total compressed third refrigerant stream exiting third refrigerant compressor 22, the LNG facility of FIG. 1 can process additional natural gas feed. By processing additional feed gas, additional refrigeration duty can be recovered in the third refrigeration cycle, which can ultimately result in incremental LNG and/or NGL production. In addition, when the domestic gas product is withdrawn from an open-loop cycle, as illustrated in FIG. 1, producing a domestic gas stream can help control the concentration of light contaminants (e.g., nitrogen) in the refrigeration loop, thereby allowing the LNG facility increased processing flexibility. Further, because of the relatively low concentration of heavies and other contaminants in the domestic gas product in conduit 109*a*, at least a portion of the domestic gas product can subsequently be blended with an unprocessed or off-spec domestic gas stream from another source (not shown) in order to produce a saleable domestic gas product. Optionally, one or more fuel gas streams (not shown) for use within the LNG facility can be withdrawn from the domestic gas stream and/or the compressed refrigerant stream in conduits 109*a*, 109*b*. Typically, at least a portion of the fuel gas stream can be used to power one or more gas turbine used to drive at least one refrigerant compressor.

Figure 2:
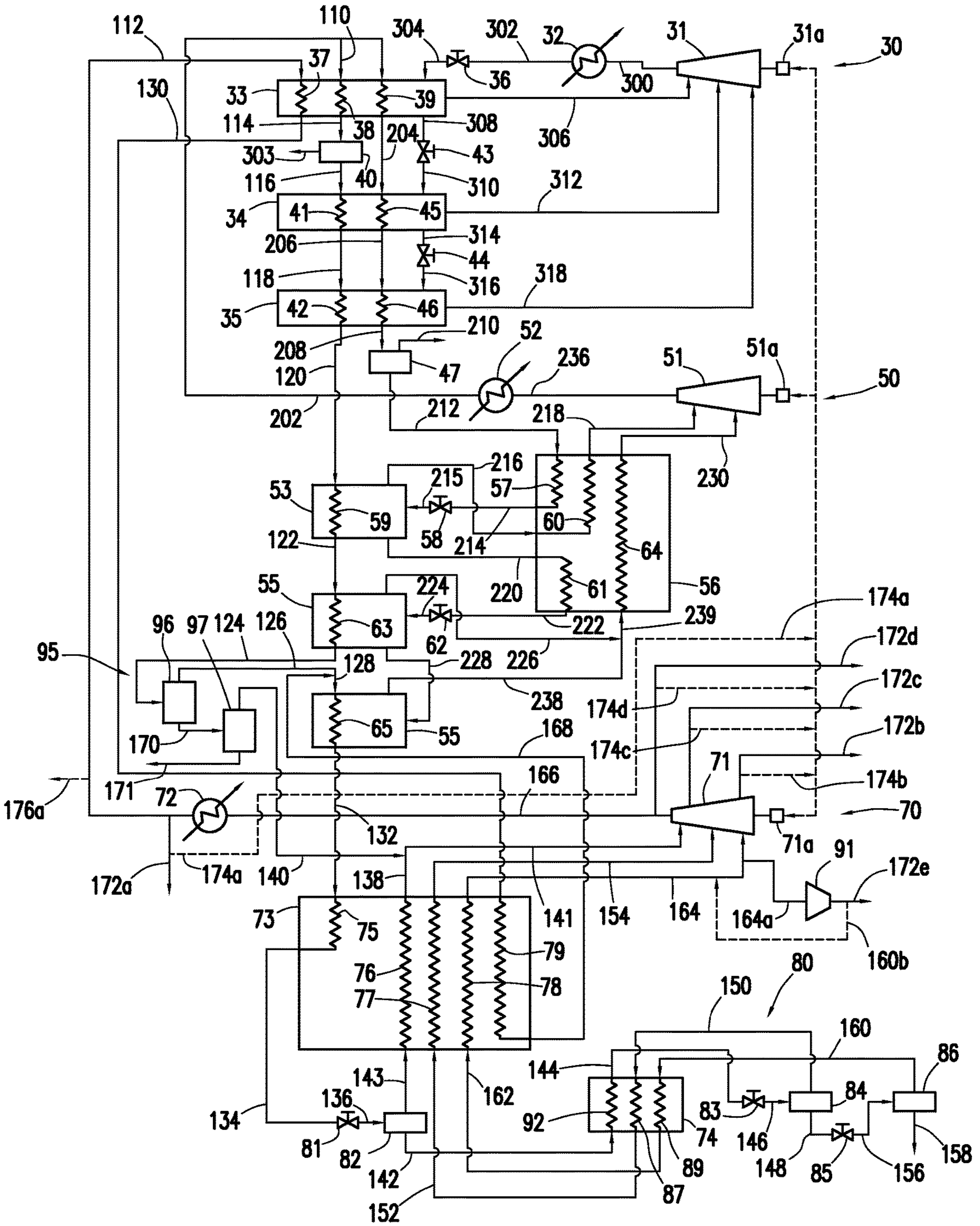
FIG. 2 is a schematic diagram of an embodiment of a cascade-type LNG facility.

FIG. 2 presents one embodiment of a specific configuration of the LNG facility shown in FIG. 1. While "propane," "ethylene," and "methane" are used to refer to respective first, second, and third refrigerants, it should be understood that the embodiment illustrated in FIG. 2 and described herein can apply to any combination of suitable refrigerants. The LNG facility depicted in FIG. 2 generally comprises a propane refrigeration cycle 30, an ethylene refrigeration cycle 50, a methane refrigeration cycle 70 with an expansion section 80, and a heavies removal zone 95. To facilitate an understanding of FIG. 2, the following numeric nomenclature was employed. Items numbered 31 through 49 are process vessels and equipment directly associated with propane refrigeration cycle 30, and items numbered 51 through 69 are process vessels and equipment related to ethylene refrigeration cycle 50. Items numbered 71 through 94 correspond to process vessels and equipment associated with methane refrigeration cycle 70 and/or expansion section 80. Items numbered 96 through 99 are process vessels and equipment associated with heavies removal zone 95. Items numbered 100 through 199 correspond to flow lines or conduits that contain predominantly methane streams. Items numbered 200 through 299 correspond to flow lines or conduits which contain predominantly ethylene streams. Items numbered 300 through 399 correspond to flow lines or conduits that contain predominantly propane streams.

Referring to FIG. 2, the main components of propane refrigeration cycle 30 include a propane compressor 31, a propane cooler 32, a high-stage propane chiller 33, an intermediate stage propane chiller 34, and a low-stage propane chiller 35. The main components of ethylene refrigeration cycle 50 include an ethylene compressor 51, an ethylene cooler 52, a high-stage ethylene chiller 53, an intermediate-stage ethylene chiller 54, a low-stage ethylene chiller/condenser 55, and an ethylene economizer 56. The main components of methane refrigeration cycle 70 include a methane compressor 71, a methane cooler 72, a main methane economizer 73, and a secondary methane economizer 74. The main components of expansion section 80 include a high-stage methane expander 81, a high-stage methane flash drum 82, an intermediate-stage methane expander 83, an intermediate-stage methane flash drum 84, a low-stage methane expander 85, and a low-stage methane flash drum 86. The LNG facility of FIG. 2 also includes heavies removal zone 95 downstream of intermediate stage ethylene chiller 54 for removing heavy hydrocarbon components from the processed natural gas and recovering the resulting natural gas liquids. The heavies removal zone 95 of FIG. 2 is shown as generally comprising a first distillation column 96 and a second distillation column 97.

The operation of the LNG facility illustrated in FIG. 2 will now be described in more detail, beginning with propane refrigeration cycle 30. Propane is compressed in multi-stage (e.g., three-stage) propane compressor 31 driven by, for example, a gas turbine driver 31*a*. The three stages of compression preferably exist in a single unit, although each stage of compression may be a separate unit and the units mechanically coupled to be driven by a single driver. Upon compression, the propane is passed through conduit 300 to propane cooler 32, wherein it is cooled and liquefied via indirect heat exchange with an external fluid (e.g., air or water). A representative temperature and pressure of the liquefied propane refrigerant exiting cooler 32 is about 100° F. and about 190 psia. The stream from propane cooler 32 can then be passed through conduit 302 to a pressure reduction means, illustrated as expansion valve 36, wherein the pressure of the liquefied propane is reduced, thereby evaporating or flashing a portion thereof. The resulting two-phase stream then flows via conduit 304 into high-stage propane chiller 33. High stage propane chiller 33 uses indirect heat exchange means 37, 38, and 39 to cool respectively, the incoming gas streams, including a yet-to-be-discussed methane refrigerant stream in conduit 112, a natural gas feed stream in conduit 110, and a yet-to-be-discussed ethylene refrigerant stream in conduit 202 via indirect heat exchange with the vaporizing refrigerant. The cooled methane refrigerant stream exits high-stage propane chiller 33 via conduit 130 and can subsequently be routed to the inlet of main methane economizer 73, which will be discussed in greater detail in a subsequent section.

The cooled natural gas stream from high-stage propane chiller 33 (also referred to herein as the "methane-rich stream") flows via conduit 114 to a separation vessel 40, wherein the gaseous and liquid phases are separated. The liquid phase, which can be rich in propane and heavier components ($C_3$+), is removed via conduit 303. The predominately vapor phase exits separator 40 via conduit 116 and can then enter intermediate-stage propane chiller 34, wherein the stream is cooled in indirect heat exchange means 41 via indirect heat exchange with a yet-to-be-discussed propane refrigerant stream. The resulting two-phase methane-rich stream in conduit 118 can then be routed to low-stage propane chiller 35, wherein the stream can be further cooled via indirect heat exchange means 42. The resultant predominantly methane stream can then exit low-stage propane chiller 35 via conduit 120. Subsequently, the cooled methane-rich stream in conduit 120 can be routed to high-stage ethylene chiller 53, which will be discussed in more detail shortly.

The vaporized propane refrigerant exiting high-stage propane chiller 33 is returned to the high-stage inlet port of propane compressor 31 via conduit 306. The residual liquid propane refrigerant in high-stage propane chiller 33 can be passed via conduit 308 through a pressure reduction means, illustrated here as expansion valve 43, whereupon a portion of the liquefied refrigerant is flashed or vaporized. The resulting cooled, two-phase refrigerant stream can then enter intermediate-stage propane chiller 34 via conduit 310, thereby providing coolant for the natural gas stream and yet-to-be-discussed ethylene refrigerant stream entering intermediate-stage propane chiller 34. The vaporized propane refrigerant exits intermediate-stage propane chiller 34 via conduit 312 and can then enter the intermediate-stage inlet port of propane compressor 31. The remaining liquefied propane refrigerant exits intermediate-stage propane chiller 34 via conduit 314 and is passed through a pressure-reduction means, illustrated here as expansion valve 44, whereupon the pressure of the stream is reduced to thereby flash or vaporize a portion thereof. The resulting vapor-liquid refrigerant stream then enters low-stage propane chiller 35 via conduit 316 and cools the methane-rich and yet-to-be-discussed ethylene refrigerant streams entering low-stage propane chiller 35 via conduits 118 and 206, respectively. The vaporized propane refrigerant stream then exits low-stage propane chiller 35 and is routed via conduit 318 to the low-stage inlet port of propane compressor 31, wherein the stream is compressed and recycled as previously described.

As shown in FIG. 2, a stream of ethylene refrigerant in conduit 202 enters high-stage propane chiller 33, wherein the ethylene stream is cooled via indirect heat exchange means 39. The resulting cooled stream in conduit 204 then exits high-stage propane chiller 33, whereafter the at least partially condensed stream enters intermediate-stage propane chiller 34. Upon entering intermediate-stage propane chiller 34, the ethylene refrigerant stream can be further cooled via indirect heat exchange means 45. The resulting two-phase ethylene stream can then exit intermediate-stage propane chiller 34 prior to entering low-stage propane chiller 35 via conduit 206. In low-stage propane chiller 35, the ethylene refrigerant stream can be at least partially condensed, or condensed in its entirety, via indirect heat exchange means 46. The resulting stream exits low-stage propane chiller 35 via conduit 208 and can subsequently be routed to a separation vessel 47, wherein the vapor portion of the stream, if present, can be removed via conduit 210. The liquefied ethylene refrigerant stream exiting separator 47 via conduit 212 can have a representative temperature and pressure of about −24° F. and about 285 psia.

Turning now to ethylene refrigeration cycle 50 in FIG. 2, the liquefied ethylene refrigerant stream in conduit 212 can enter ethylene economizer 56, wherein the stream can be further cooled by an indirect heat exchange means 57. The sub-cooled liquid ethylene stream in conduit 214 can then be routed through a pressure reduction means, illustrated here as expansion valve 58, whereupon the pressure of the stream is reduced to thereby flash or vaporize a portion thereof. The cooled, two-phase stream in conduit 215 can then enter high-stage ethylene chiller 53, wherein at least a portion of the ethylene refrigerant stream can vaporize to thereby cool the methane-rich stream entering an indirect heat exchange means 59 of high-stage ethylene chiller 53 via conduit 120. The vaporized and remaining liquefied refrigerant exit high-stage ethylene chiller 53 via respective conduits 216 and 220. The vaporized ethylene refrigerant in conduit 216 can re-enter ethylene economizer 56, wherein the stream can be warmed via an indirect heat exchange means 60 prior to entering the high-stage inlet port of ethylene compressor 51 via conduit 218, as shown in FIG. 2.

The remaining liquefied refrigerant in conduit 220 can re-enter ethylene economizer 56, wherein the stream can be further sub-cooled by an indirect heat exchange means 61. The resulting cooled refrigerant stream exits ethylene economizer 56 via conduit 222 and can subsequently be routed to a pressure reduction means, illustrated here as expansion valve 62, whereupon the pressure of the stream is reduced to thereby vaporize or flash a portion thereof. The resulting, cooled two-phase stream in conduit 224 enters intermediate-stage ethylene chiller 54, wherein the refrigerant stream can cool the natural gas stream in conduit 122 entering intermediate-stage ethylene chiller 54 via an indirect heat exchange means 63. As shown in FIG. 2, the resulting cooled methane-rich stream exiting intermediate stage ethylene chiller 54 can then be routed to heavies removal zone 95 via conduit 124. Heavies removal zone 95 will be discussed in detail in a subsequent section.

The vaporized ethylene refrigerant exits intermediate-stage ethylene chiller 54 via conduit 226, whereafter the stream can combine with a yet-to-be-discussed ethylene vapor stream in conduit 238. The combined stream in conduit 239 can then enter ethylene economizer 56, wherein the stream is warmed in an indirect heat exchange means 64 prior to being fed into the low-stage inlet port of ethylene compressor 51 via conduit 230. Ethylene compressor 51 can be driven by, for example, a gas turbine driver 51*a*. Ethylene compressor 51 comprises at least one stage of compression, and, when multiple stages are employed, the stages can exist in a single unit or can be separate units mechanically coupled to a common driver. Generally, when ethylene compressor 51 comprises two or more compression stages, one or more intercoolers (not shown) can be provided between subsequent compression stages. As shown in FIG. 2, a stream of compressed ethylene refrigerant in conduit 236 can subsequently be routed to ethylene cooler 52, wherein the ethylene stream can be cooled via indirect heat exchange with an external fluid (e.g., water or air). The resulting, at least partially condensed ethylene stream can then be introduced via conduit 202 into high-stage propane chiller 33 for additional cooling as previously described.

The remaining liquefied ethylene refrigerant exits intermediate-stage ethylene chiller 54 via conduit 228 prior to entering low-stage ethylene chiller/condenser 55, wherein the refrigerant can cool the methane-rich stream entering low-stage ethylene chiller/condenser via conduit 128 in an indirect heat exchange means 65. In one embodiment shown in FIG. 2, the stream in conduit 128 results from the combination of a heavies-depleted (i.e., light hydrocarbon rich) stream exiting heavies removal zone 95 via conduit 126 and a yet-to-be-discussed methane refrigerant stream in conduit 168. As shown in FIG. 2, the vaporized ethylene refrigerant can then exit low-stage ethylene chiller/condenser 55 via conduit 238 prior to combining with the vaporized ethylene exiting intermediate-stage ethylene chiller 54 via conduit 226 and entering the low-stage inlet port of ethylene compressor 51, as previously discussed.

The cooled natural gas stream exiting low-stage ethylene chiller/condenser in conduit 132 can also be referred to as the "pressurized LNG-bearing stream." As shown in FIG. 2, the pressurized LNG-bearing stream exits low-stage ethylene chiller/condenser 55 via conduit 132 prior to entering main methane economizer 73. In main methane economizer 73, the methane-rich stream can be cooled in an indirect heat exchange means 75 via indirect heat exchange with one or more yet-to-be discussed methane refrigerant streams. The cooled, pressurized LNG-bearing stream exits main methane economizer 73 and can then be routed via conduit 134 into expansion section 80 of methane refrigeration cycle 70. In expansion section 80, the cooled predominantly methane stream passes through high-stage methane expander 81, whereupon the pressure of the stream is reduced to thereby vaporize or flash a portion thereof. The resulting two-phase methane-rich stream in conduit 136 can then enter high-stage methane flash drum 82, whereupon the vapor and liquid portions can be separated. The vapor portion exiting high-stage methane flash drum 82 (i.e., the high-stage flash gas) via conduit 143 can then enter main methane economizer 73, wherein the stream is heated via indirect heat exchange means 76. The resulting warmed vapor stream exits main methane economizer 73 via conduit 138 and subsequently combines with a yet-to-be-discussed vapor stream exiting heavies removal zone 95 in conduit 140. The combined stream in conduit 141 can then be routed to the high-stage inlet port of methane compressor 71, as shown in FIG. 2.

The liquid phase exiting high-stage methane flash drum 82 via conduit 142 can enter secondary methane economizer 74, wherein the methane stream can be cooled via indirect heat exchange means 92. The resulting cooled stream in conduit 144 can then be routed to a second expansion stage, illustrated here as intermediate-stage expander 83, wherein the pressure of the stream can be reduced to thereby evaporate or flash a portion thereof. The resulting two-phase methane-rich stream in conduit 146 can then enter intermediate-stage methane flash drum 84, wherein the liquid and vapor portions of the stream can be separated and can exit the intermediate-stage flash drum via respective conduits 148 and 150. The vapor portion (i.e., the intermediate-stage flash gas) in conduit 150 can re-enter secondary methane economizer 74, wherein the stream can be heated via an indirect heat exchange means 87. The warmed stream can then be routed via conduit 152 to main methane economizer 73, wherein the stream can be further warmed via an indirect heat exchange means 77 prior to entering the intermediate-stage inlet port of methane compressor 71 via conduit 154.

The liquid stream exiting intermediate-stage methane flash drum 84 via conduit 148 can then pass through a low-stage expander 85, whereupon the pressure of the liquefied methane-rich stream can be further reduced to thereby vaporize or flash a portion thereof. The resulting cooled, two-phase stream in conduit 156 can then enter low-stage methane flash drum 86, wherein the vapor and liquid phases can be separated. The liquid stream exiting low-stage methane flash drum 86 can comprise the liquefied natural gas (LNG) product. The LNG product, which is at about atmospheric pressure, can be routed via conduit 158 downstream for subsequent storage, transportation, and/or use.

The vapor stream exiting low-stage methane flash drum 86 (i.e., the low-stage methane flash gas) in conduit 160 can be routed to secondary methane economizer 74, wherein the stream can be warmed via an indirect heat exchange means 89. The resulting stream can exit secondary methane economizer 74 via conduit 162, whereafter the stream can be routed to main methane economizer 73 to be further heated via indirect heat exchange means 78. The warmed methane vapor stream can then exit main methane economizer 73 via conduit 164, whereafter the stream can be split into two portions. The first portion in conduit 164 can enter the low-stage inlet port of methane compressor 71, which will be discussed in detail shortly. The second portion in conduit 164*a* can be routed to an inlet port of a sales gas compressor 91. The compressed gas product exiting sales gas compressor 91 via conduit 172*e* can then cooled (not shown) and routed to a location external to the LNG facility for use as a domestic gas product. Optionally, as shown in FIG. 2, at least a portion of the compressed gas stream in conduit 172*e* can be routed via conduit 160*b* to recombine with the warmed refrigerant stream in conduit 164.

As previously discussed, the warmed methane refrigerant stream in conduit 164 can enter the low-stage inlet port of methane compressor 71. Methane compressor 71 can be driven by, for example, a gas turbine driver 71*a*. Methane compressor 71 comprises at least one stage of compression, and, when multiple stages are employed, the stages can exist in a single unit or can be separate units mechanically coupled to a common driver. Generally, when methane compressor 71 comprises two or more compression stages, one or more intercoolers (not shown) can be provided between subsequent compression stages.

As shown in FIG. 2, the compressed methane refrigerant stream exiting methane compressor 71 can be discharged into conduit 166, whereafter the stream can be cooled via indirect heat exchange with an external fluid (e.g., air or water) in methane cooler 72. In one embodiment, the cooled compressed refrigerant stream can then be split into a compressed refrigerant fraction in conduit 112 and a domestic gas fraction in conduit 172*a*. Optionally, a fuel gas stream can be withdrawn from the domestic gas fraction via conduit 174*a* and/or from the compressed refrigerant fraction via conduit 176*a*. The domestic gas fraction in conduit 172*a* can subsequently be routed to a location outside the LNG facility, whereafter the domestic gas stream can optionally be combined with another gas stream (e.g., a portion of the feed natural gas) prior to being transported and sold to subsequent users. The fuel gas stream, if present, can be routed to one or more fuel gas consumers (e.g., gas turbine drivers 31*a*, 51*a*, and 71*a* of respective propane, ethylene, and methane compressors 31, 51, 71) within the LNG facility. In another embodiment, a domestic gas fraction can be withdrawn from the streams exiting the discharge of the low-stage, intermediate-stage, and/or high-stage of methane compressor 71, as indicated in FIG. 1 by respective lines 172*b*, 172*c*, and 172*d*. In addition, optional fuel gas streams 174*b-d* can be withdrawn from the domestic gas fractions in corresponding conduits 172*b-d* or from the remaining compressed refrigerant fractions exiting the low, intermediate, and high stages of methane compressor 71 (not shown). As illustrated in FIG. 2, the compressed refrigerant fraction in conduit 112 can be further cooled in propane refrigeration cycle 30, as described in detail previously.

Upon being cooled in propane refrigeration cycle 30, the compressed methane refrigerant fraction can be discharged into conduit 130 and subsequently routed to main methane economizer 73, wherein the stream can be further cooled via indirect heat exchange means 79. The resulting sub-cooled stream exits main methane economizer 73 via conduit 168 and can then combined with the heavies-depleted stream exiting heavies removal zone 95 via conduit 126, as previously discussed.

FIGS. 3-10 illustrate embodiments of a system and method for supplying refrigerants to a cooling facility such as the LNG facility embodiments of FIGS. 1 and 2. The system may be incorporated with a LNG facility located on land or on an off-shore facility. As discussed above, although the supply system and method embodiments are described in conjunction with a LNG facility, it could be used in conjunction with other cooling facilities.

Prior to utilizing the LNG facility, suitable refrigerants may be supplied to the facility for use in various cooling units. Such refrigerants may be initially supplied to the facility (referred to as a "first fill") from suitable storage tanks or other storage locations, and may also be supplied after the first fill or during the liquefaction process (referred to as "online filling). An important consideration when introducing refrigerants to a LNG facility is the rate of temperature change of the refrigerant. A rapid temperature change (e.g., temperature delta of 2° C./min or greater) should be avoided to prevent thermal shock which can cause extremely high local thermal stresses, cracking, and separation, and therefore leaking (e.g., plate/fins distorting enough to cause a failure). The supply systems and methods described herein provide for accurate control of refrigerant temperature to avoid such shock.

Figure 3:
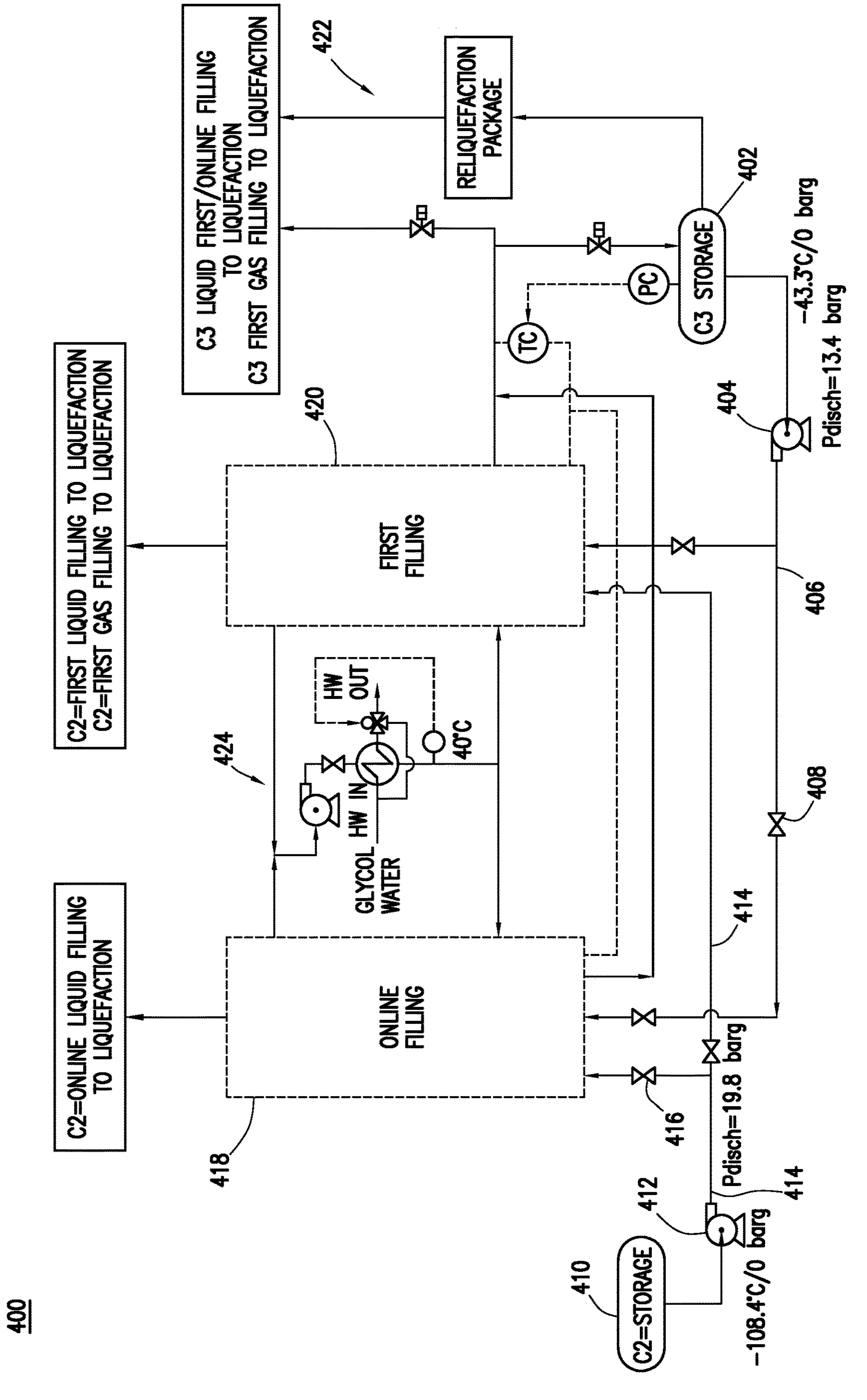
FIG. 3 is a schematic diagram of an embodiment of a system for supplying refrigerants to a cooling system such as the cascade-type LNG facility of FIG. 1 and/or FIG. 2.

FIG. 3 shows an embodiment of an assembly or system 400 for supplying refrigerants to a LNG system or facility. The system is configured to transmit refrigerants to the LNG facility and fill components of the LNG facility from low pressure storage. As described herein, "low pressure" refers to refrigerant pressures lower than those required or selected for the LNG facility, such as atmospheric or near atmospheric pressure. Pressures required for the LNG facility (also referred to as LNG facility pressures) include, for example, pressures within the chillers 18 and 21 and/or within the chillers 33-35 and 53-55.

The system 400 is configured to supply refrigerants from low pressure liquid storage, which provides numerous advantages. For example, supply systems that use pressurized liquid storage typically employ a vaporizer to fill a LNG facility at the low stage, which can be very slow. Other systems collect and compress boil off gas (BOG) from a pressurized storage facility to supply a LNG facility on an ongoing basis, and then intermittently purge ethylene from the liquefaction section of the LNG facility, which requires a complex non-submersible cryogenic pump which must be vented adequately. The system 400 addresses these issues in that the system can be used to fill cooling sections with liquid refrigerant at a high rate (e.g., around 30,000 kg/h). In addition, the system 400 can be operated using relatively simple pumping mechanisms, which reduces cost and complexity. Further, due to the use of liquid refrigerant storage at low pressure, submersible pumps can be used in the refrigerant storage devices, which can reduce the amount of space required for refrigerant storage and supply.

In one embodiment, the system 400 is coupled to a multi-refrigerant cooling facility, such as a cascade type LNG facility described above. The system 400 can supply multiple refrigerants to the facility, in succession or simultaneously.

The supply system 400 is connected in fluid communication with a first refrigerant storage device or container 402 via a pump 404 and a conduit 406. The pump 404 may be external to the container 402 or integrated therewith (e.g., submersible). Expansion and/or control valves 408 may be coupled to the conduit 406 to control the refrigerant pressure and/or control the fluid path. The first refrigerant container 402 stores a first refrigerant in liquid form that has a first boiling point. For example, the container 402 stores propane (C3) and is referred to as "C3 storage". The first refrigerant is also stored at a low pressure, e.g., atmospheric pressure (0 barg), and at a temperature below the boiling point (e.g., −43.3° C.).

The supply system 400 is connected to a second refrigerant (e.g., ethylene or ethane) storage device or container 410 via a pump 412 and a conduit 414. The container 410 stores the second refrigerant in liquid form, which has a second boiling point that is lower than the first boiling point. Expansion and/or control valves 416 may be coupled to the conduit 414 to control the refrigerant pressure and/or flow path. As shown in FIG. 3, the second refrigerant container 410, which in this example stores ethylene (C2) and is referred to as "C2 storage", stores the second refrigerant at a low pressure. For example, the second refrigerant is stored at atmospheric pressure (0 barg) at a temperature below the boiling point (e.g., −108.4° C.).

The first and second refrigerants are supplied to various filling sections or components of the system 400. For example, the system 400 includes C2 filling sections 418 and 420, and C3 filling sections 422. The system 400 also includes temperature control devices or components to allow for controlled heating of the refrigerants to avoid thermal shock. For example, the system 400 includes a heating or temperature control assembly 424 that can be used to control the temperature of the first and/or second refrigerant. The system 400 is configured to fill the LNG facility by transferring liquid refrigerant and/or gaseous refrigerant as desired.

In one embodiment, the temperature of the first and/or second refrigerant is controlled at least partially by a heat transfer between the first and second refrigerants. For example, the second refrigerant is pressurized and then heated using the first refrigerant, which has a higher boiling point and is stored in storage 402 at a higher temperature than the second refrigerant. The heated second refrigerant is heated to a level suitable for introduction into the LNG facility and then transferred to a cooling unit therein. The first refrigerant is cooled by heat transfer with the second refrigerant, and is subsequently heated by, e.g., temperature control assembly 424 to bring the temperature to a level suitable for introduction to the LNG facility. The first refrigerant and the second refrigerant are described in these embodiments as propane and ethylene respectively, but are not so limited. The first refrigerant can be any suitable refrigerant fluid that has a higher boiling point than the second refrigerant, and does not freeze when engaging the colder second refrigerant.

Figure 4:
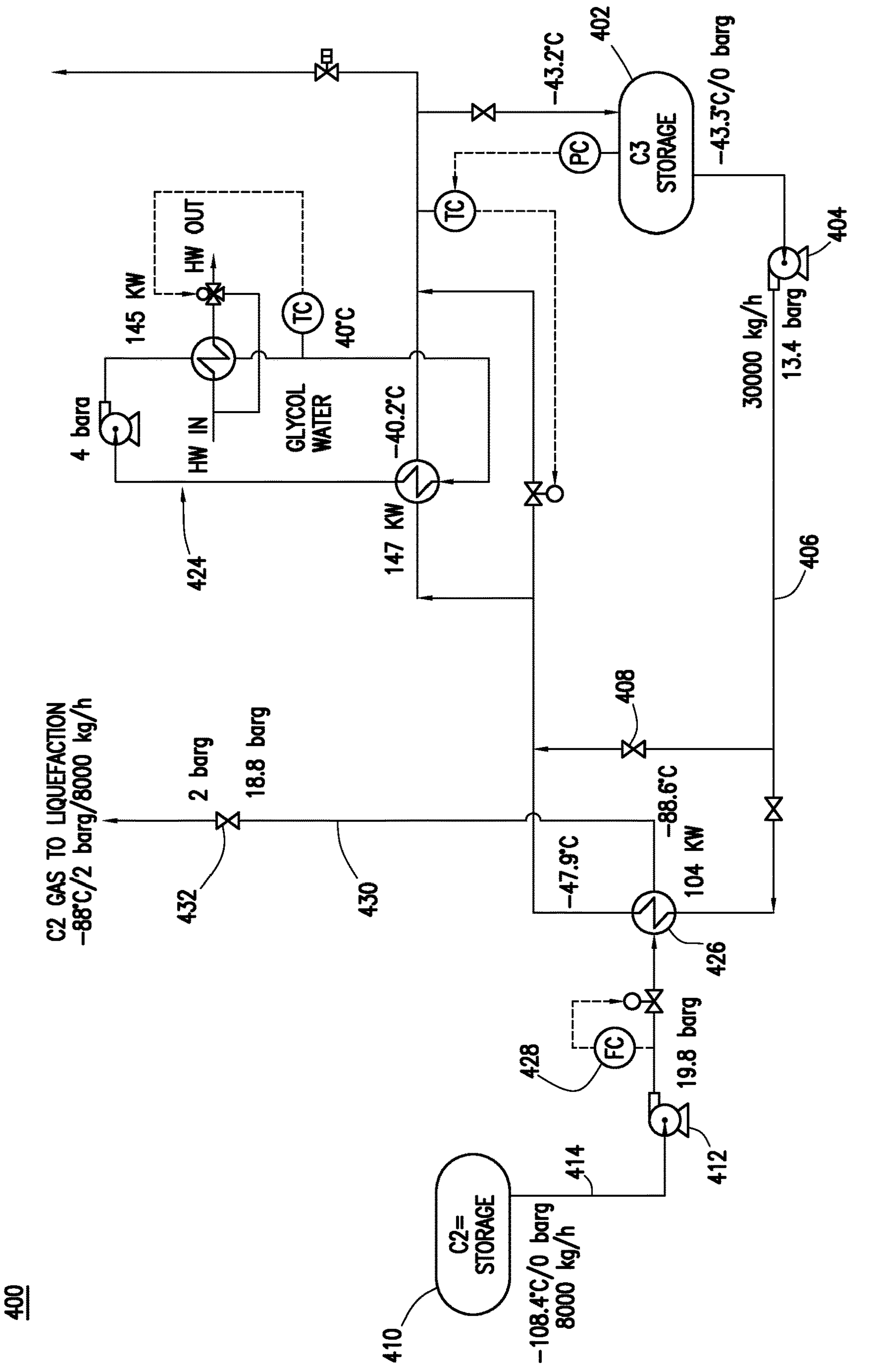
FIG. 4 is a schematic diagram of an embodiment of a portion of the system of FIG. 3 including components for online filling of a refrigerant.
Figure 5:
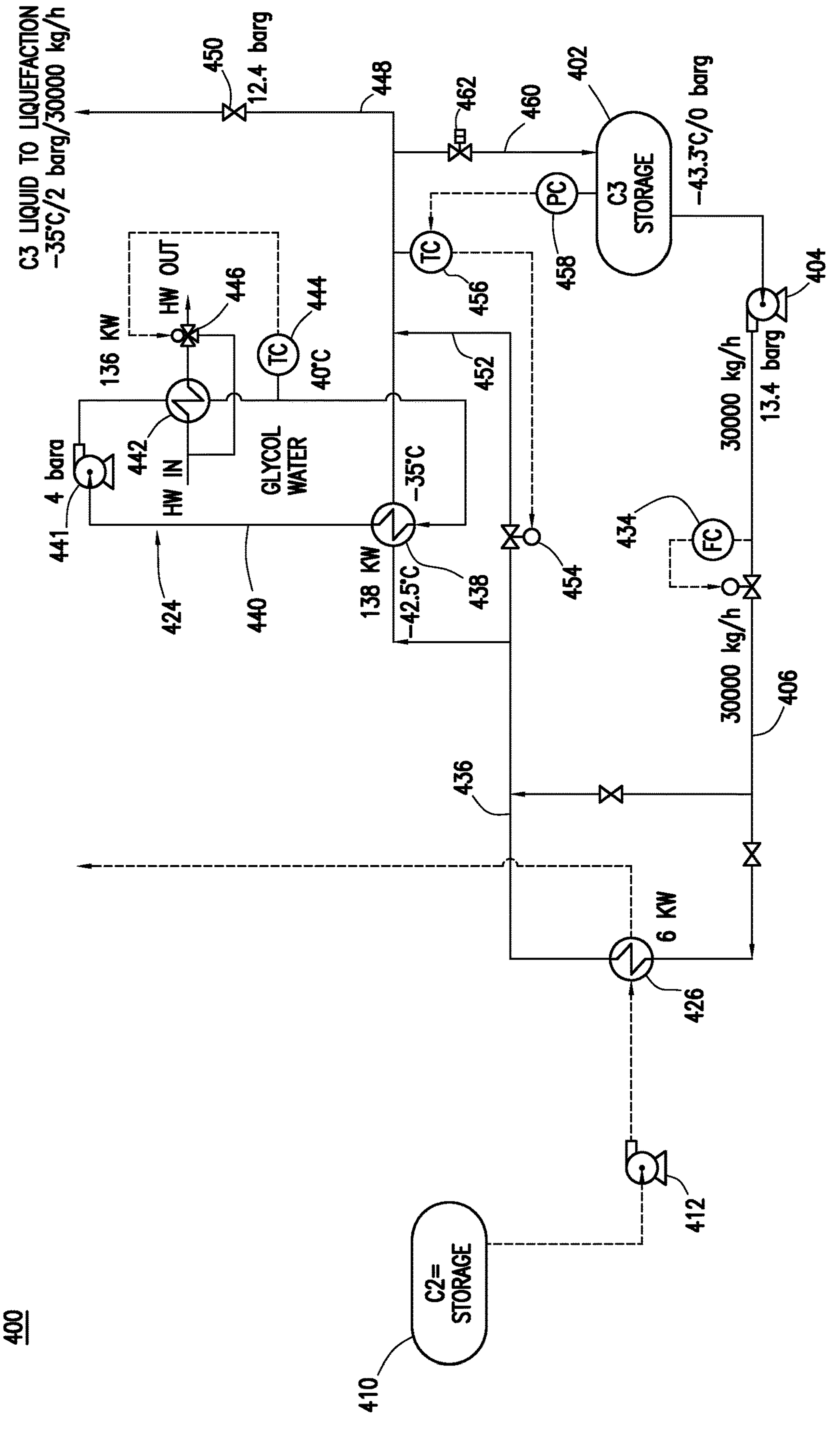
FIG. 5 is a schematic diagram of an embodiment of a portion of the system of FIG. 3 including components for online filling of a refrigerant.

FIGS. 4-5 illustrate sections of the system 400 configured for online filling. The following describes exemplary components and their operation in supplying refrigerants to a cooling facility.

Referring to FIG. 4, liquid ethylene is pressurized via pump 412 and transferred to a heat exchanger 426 via an optional flow control device 428. The heat exchanger 426 may be any type of heat exchanger that keeps the refrigerants separate (i.e., an indirect heat exchange device), such as a core-in-kettle or core-in-vessel heat exchanger.

The ethylene proceeds through the heat exchanger 426, where the ethylene is heated by liquid propane supplied from the container 402 (which is consequently cooled). For example, the ethylene is heated from about −108.4° C. to about −88.6° C., and the propane is cooled to about −47.9° C. The heated ethylene advances through conduit 430 and the pressure is reduced via an expansion valve 432 (e.g., to about 2 barg). Liquid ethylene is then transferred to a cooling unit of a LNG facility, such as one or more of the stages of the chiller 21. For example, the liquid ethylene is transferred from the expansion valve 432 at about −88° C. and about 2 barg to the low-stage ethylene chiller/condenser 55.

Referring to FIG. 5, liquid propane is pressurized via the pump 404 and advances through the conduit 406 and through an optional flow controller 434. The propane is about −42.5° C. after pumping and pressure drop.

In one embodiment, the propane is advanced to a temperature control device such as the temperature control assembly 424. The propane advances through a conduit 436 to the heating or temperature control assembly 424. An exemplary temperature control assembly includes a heat exchanger 438 configured to transfer heat from a heating fluid to the propane to heat the propane to a desired temperature. Any suitable heating fluid such as air or other gases, water, oil process streams could be used. In one example, the heating fluid is water combined with a glycol or other freezing point depressant to lower the heating fluid freezing point.

In the example shown in FIG. 5, a heat source such as hot water is used to control the temperature of heating fluid in a closed loop conduit 440 circulated using a pump 441. The hot water (e.g., water heated using waste heat from the LNG facility) is input to a heat exchanger 442. A temperature controller 444 is operatively coupled to a control valve 446 to allow for control of hot water flow through the heat exchanger 442 to thereby control the temperature of the heating fluid. For example, the propane enters the heat exchanger 438 at about −42.5° C. and is heated to about −35° C. The heated propane is transferred to the LNG facility via a conduit 448 and an expansion valve 450 to the LNG facility, such as one or more of the stages of the chiller 18. For example, the liquid propane is transferred from the temperature control assembly at about −35° C. and about 2 barg to the low stage propane chiller 35.

In one embodiment, a second temperature control assembly is included to control or adjust the propane temperature. The second temperature control assembly includes a bypass conduit 452 coupled to a control valve 454, which is controlled by a temperature controller 456. Flow through the control valve 454 may be controlled to adjust the propane temperature and/or to control flow to avoid vaporization of the propane. The temperature controller 456 may be coupled to a pressure controller 458 to control propane flow and return of propane to the tank via, e.g., a return conduit 460 and a valve 462. It is noted that the number and configuration of temperature control assemblies is not limited to the embodiments described herein.

Figure 6:
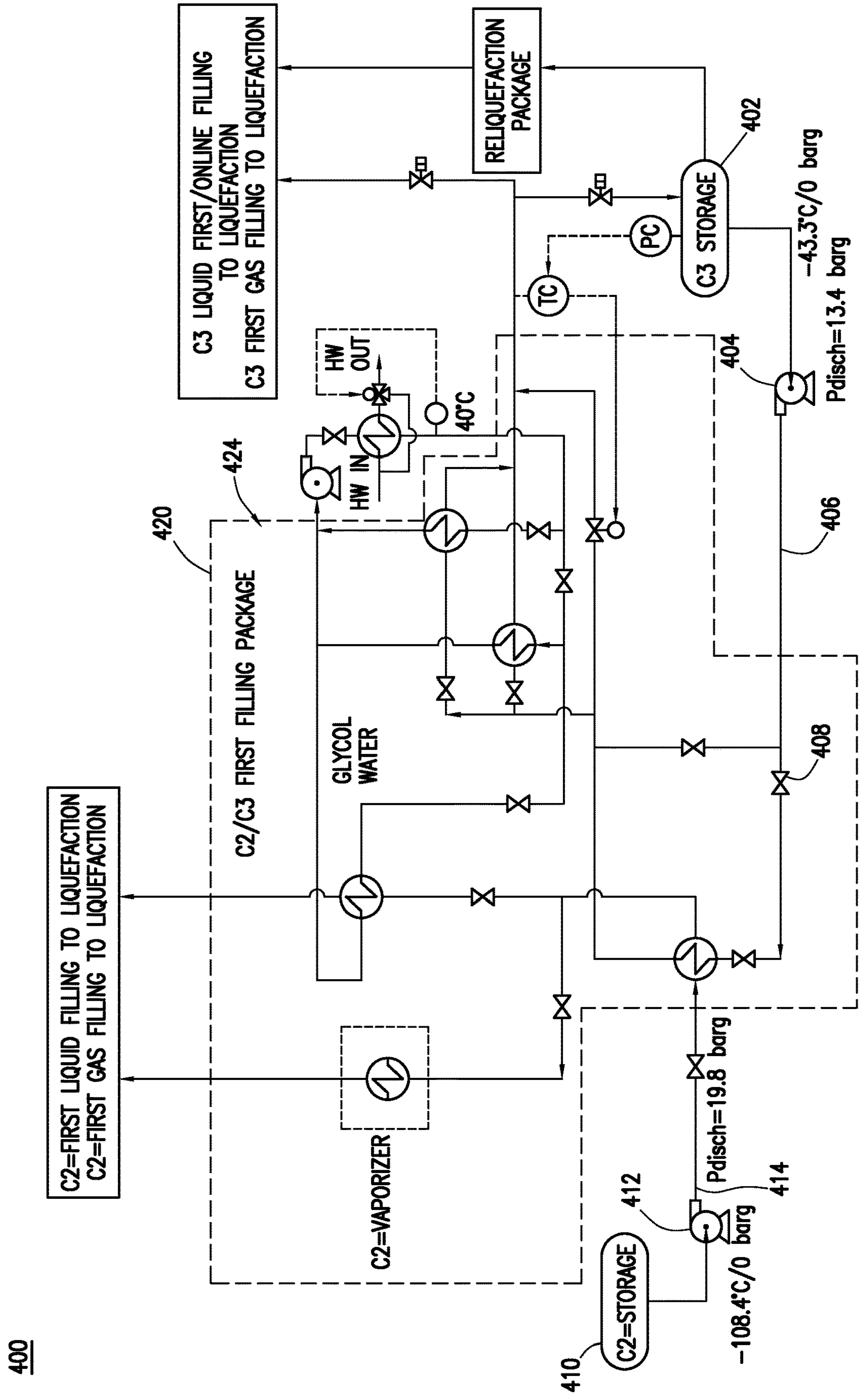
FIG. 6 is a schematic diagram of an embodiment of a portion of the system of FIG. 3 including components for first filling of multiple refrigerants.

FIGS. 6-10 illustrate embodiments of components of the system 400 configured for initially filling a LNG facility or other cooling facility. The initial filling process may be referred to as first filling. The embodiments allow for filling the LNG facility using refrigerant vapor or gas, and/or using liquid refrigerant. FIG. 6 is a schematic showing an embodiment of the system 400 that can includes components for first filling and components for online filling as discussed above. As shown, the heating assembly 424 can be used to control the temperature of the propane refrigerant, and may also be configured to provide temperature control for the ethylene refrigerant if desired. As discussed further below, some components of the system 400 can be used for both first filling procedures and online filling procedures. The following describes exemplary components and their operation in supplying refrigerants to a cooling facility.

Figure 7:
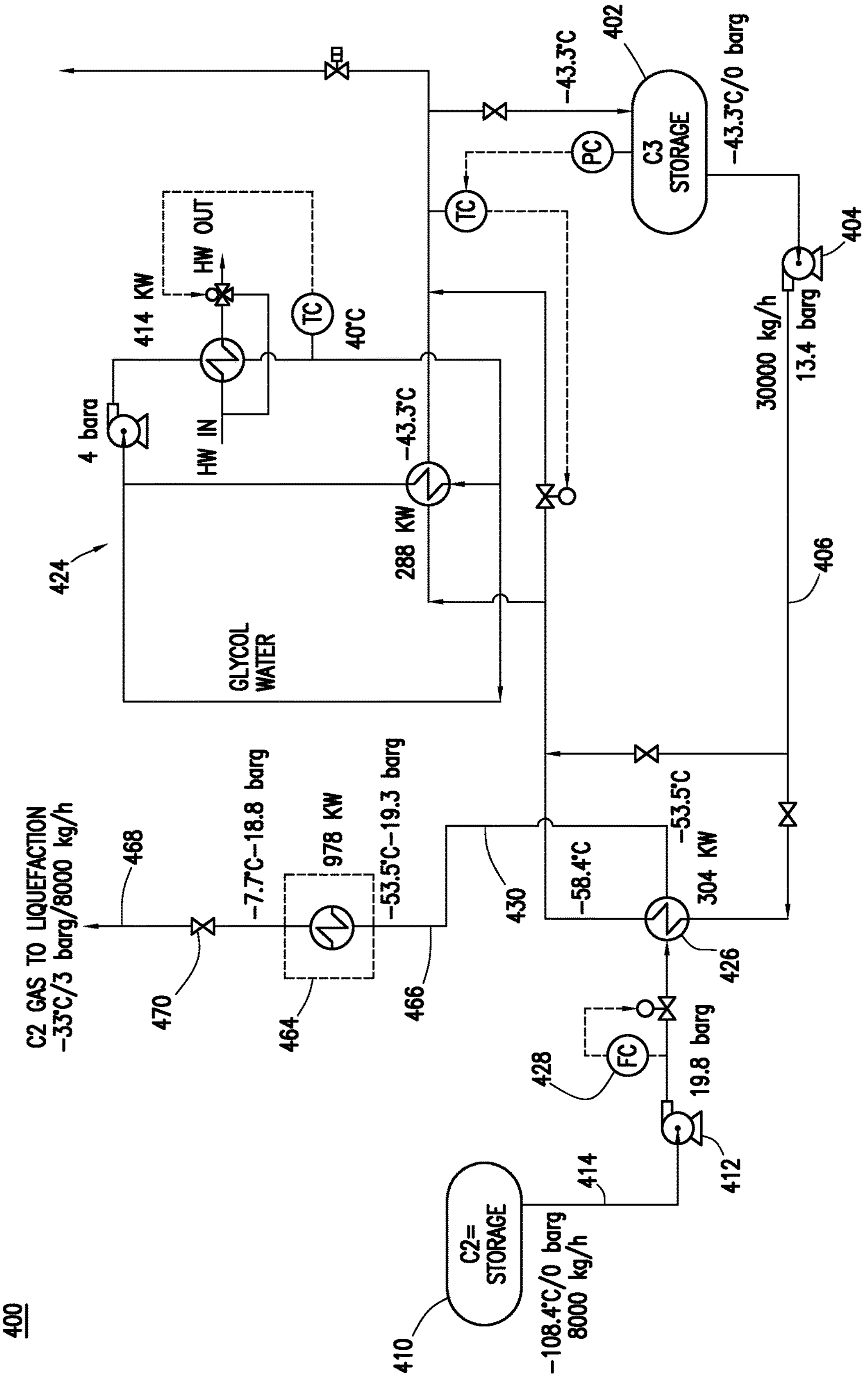
FIG. 7 is a schematic diagram of a portion of the system of FIG. 3 including components for first filling with a gaseous refrigerant.

FIG. 7 shows components of the system 400 configured for first filling with gaseous ethylene. Liquid ethylene is pressurized via pump 412 (e.g., to 19.8 barg) and transferred to the heat exchanger 426. The ethylene proceeds through the heat exchanger 426 where the ethylene is heated by propane from conduit 406. For example, the ethylene is heated to about −53.5° C., and the propane is consequently cooled to about −58.4° C. The amount of heating and cooling can be controlled by controlling fluid parameters such as ethylene flow through the heat exchanger, e.g., via flow controller 428, and/or by controlling propane flow. The heated ethylene advances through conduit 430 and is diverted to a heat exchanger and vaporizer 464 via a conduit 466, where the ethylene is further heated (e.g., using hot water or other liquid or possibly an electric heater) and vaporized. The vaporized ethylene is then transferred to a conduit 468 and the pressure is reduced via an expansion valve 470 (e.g., to about 3 barg). Ethylene gas is transferred via the conduit 468 to a cooling unit of a LNG facility, such as one or more of the stages of the chiller 21. For example, the ethylene gas is transferred from the expansion valve 470 and introduced to the high-stage ethylene chiller/condenser 53 at about −33° C. and about 3 barg.

The system 400 in this embodiment is configured to pressurize and pump liquid ethylene and then vaporize the ethylene using a suitable vaporizer. This configuration allows for faster pressurization of the system as compared to other techniques or devices and can effectively meet time constraints for filling (e.g., can easily meet 24-36 hour target for pressurization and filling).

Vaporizing can be done by vaporizer 464 shown in FIG. 7, or by any other means. For example, the vaporizer could be a vapor-liquid separator included with the storage container 410, or a vaporizing device configured to vaporize liquid that accumulates in a knockout (KO) drum.

Figure 8:
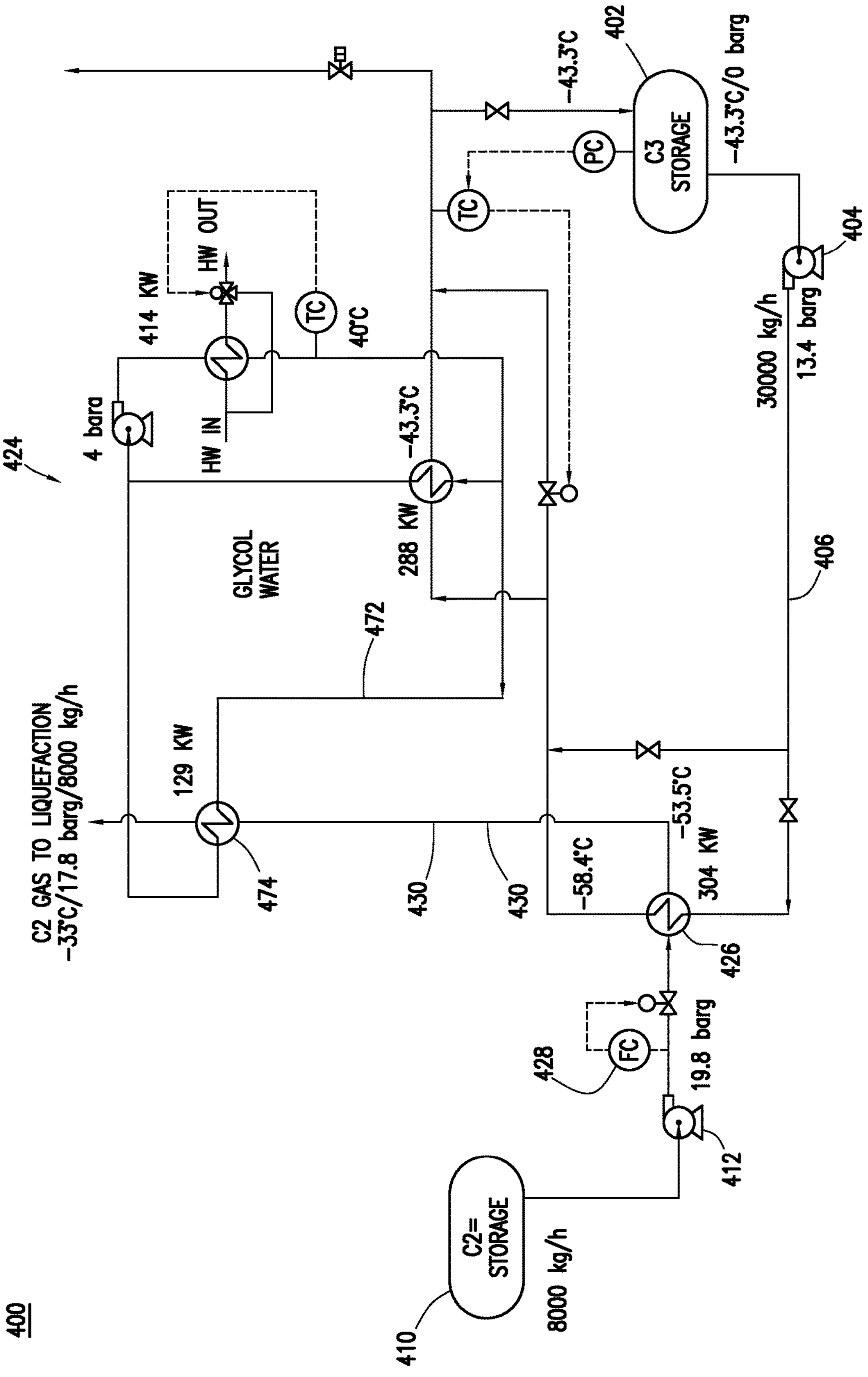
FIG. 8 is a schematic diagram of a portion of the system of FIG. 3 including components for first filling with a liquid refrigerant.

FIG. 8 shows components of the system 400 configured to supply liquid ethylene to the FNG facility during the first fill. The liquid ethylene is pressurized via pump 412, heated in the heat exchanger 426, and transferred to conduit 430. In one embodiment, the temperature control assembly 424 is configured to further control the temperature of the liquid ethylene through an additional loop 472 coupled to a heat exchanger 474. In this way, the temperature control assembly 424 can be used to heat both the ethylene and propane during first fill. The liquid ethylene is heated by the heat exchanger 474 and transferred to a cooling unit in the LNG facility, such as the chiller 21 and/or the high-stage ethylene chiller/condenser 53. For example, after first filling with ethylene gas is complete, the liquid ethylene can be introduced at a higher pressure, such as about 17.8 barg.

Although the temperature control via heat exchanger 474 is shown as part of the temperature control assembly 424, such temperature control is not so limited. For example, the temperature control can be achieved by coupling a separately controlled heat exchanger or other temperature control device or assembly to the conduit 430.

Figure 9:
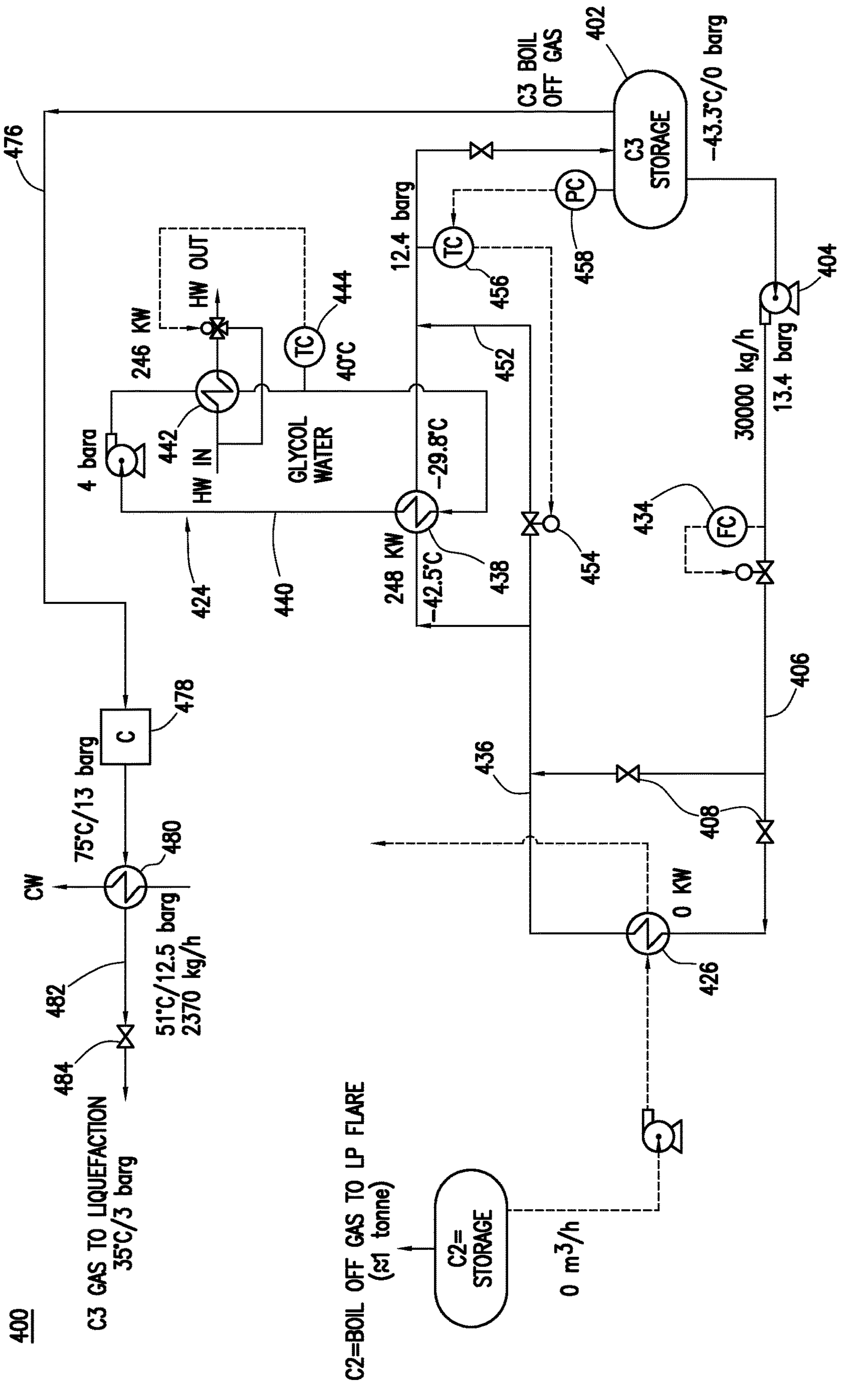
FIG. 9 is a schematic diagram of a portion of the system of FIG. 3 including components for first filling with a gaseous refrigerant.

FIG. 9 shows components of the system 400 for first fill of propane gas to the LNG facility. In one embodiment, vapor is extracted directly from the storage 402 and transferred via a conduit 476 to a compressor 478, where the propane gas is pressurized. A heat exchanger 480 may be coupled to the compressor 478 to control the temperature of the propane gas. For example, compression of the propane (e.g., from about 0 barg to about 13 barg) causes the propane temperature to increase (e.g., to about 75° C.). The heat exchanger 480 can be configured to cool the propane gas using cold water or other fluids, e.g., from about 75° C. to about 51° C. The propane gas is transferred from the compressor and/or heat exchanger to a conduit 482, which transfers the propane gas to a LNG facility unit such as the chiller 18 (e.g., the high stage cooler 33). An expansion valve 484 may be included to reduce the pressure. For example, the expansion valve lowers the pressure from about 12.5 barg to about 3 barg, and lowers the temperature from about 51° C. to about 35° C.

Figure 10:
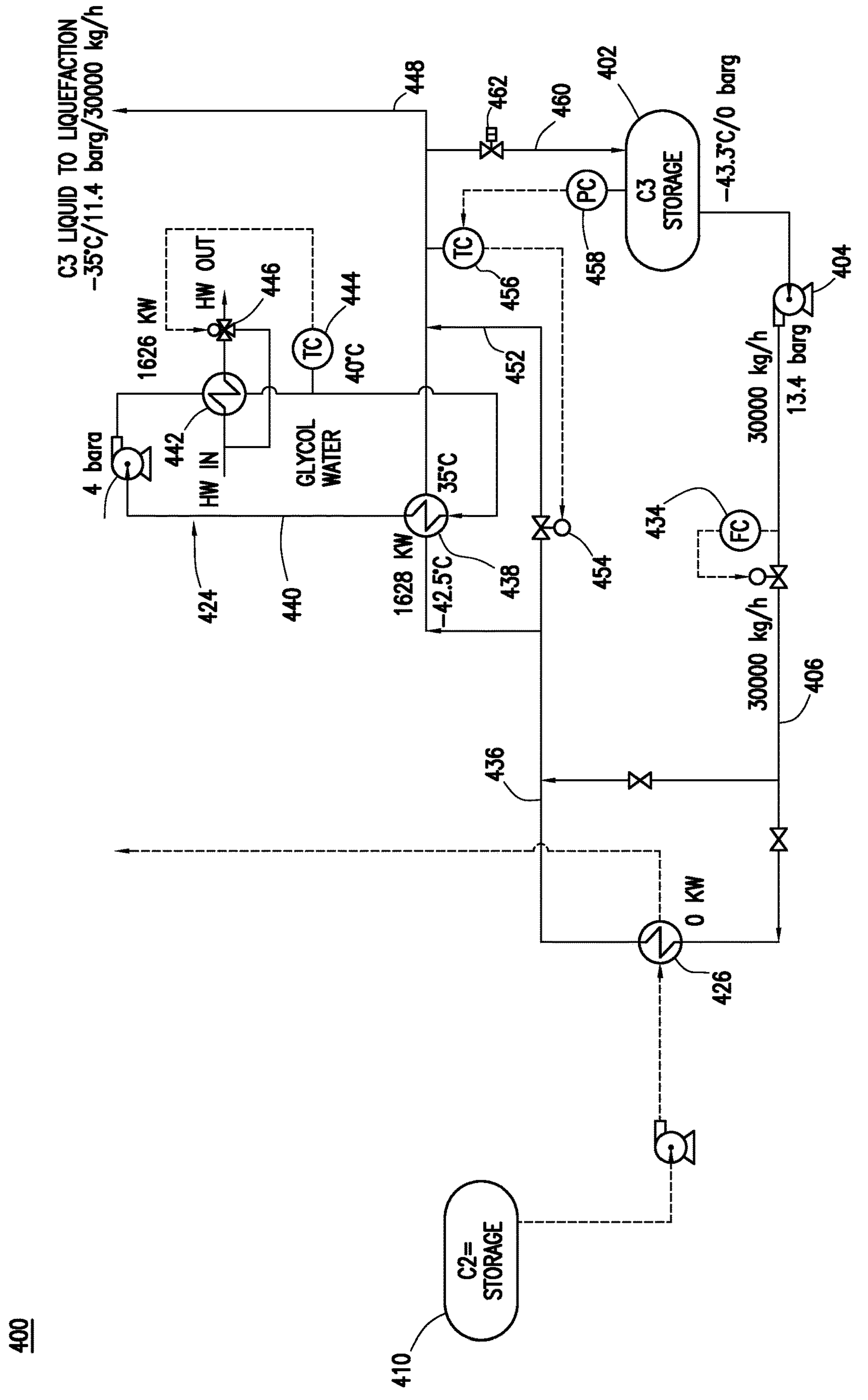
FIG. 10 is a schematic diagram of a portion of the system of FIG. 3 including components for first filling with a liquid refrigerant.

FIG. 10 illustrates the system 400 including components configured for first filling of the LNG facility with liquid propane. The pump 404 pressurizes the liquid propane, and the heat exchanger 426 and/or the temperature control assembly 424 are utilized to control the liquid propane temperature. For example, the liquid propane is pressurized to about 13.4 barg, and about −42.5° C. The liquid is then transferred to the temperature control assembly 424 and heated to about 35° C. The conduit 448 transfers the liquid propane to an LNG unit such as the high stage cooler 33. In one embodiment, the liquid propane is first filled after filling with propane gas. The propane liquid can be introduced at a relatively high pressure, such as about 11.4 barg.

Figure 11:
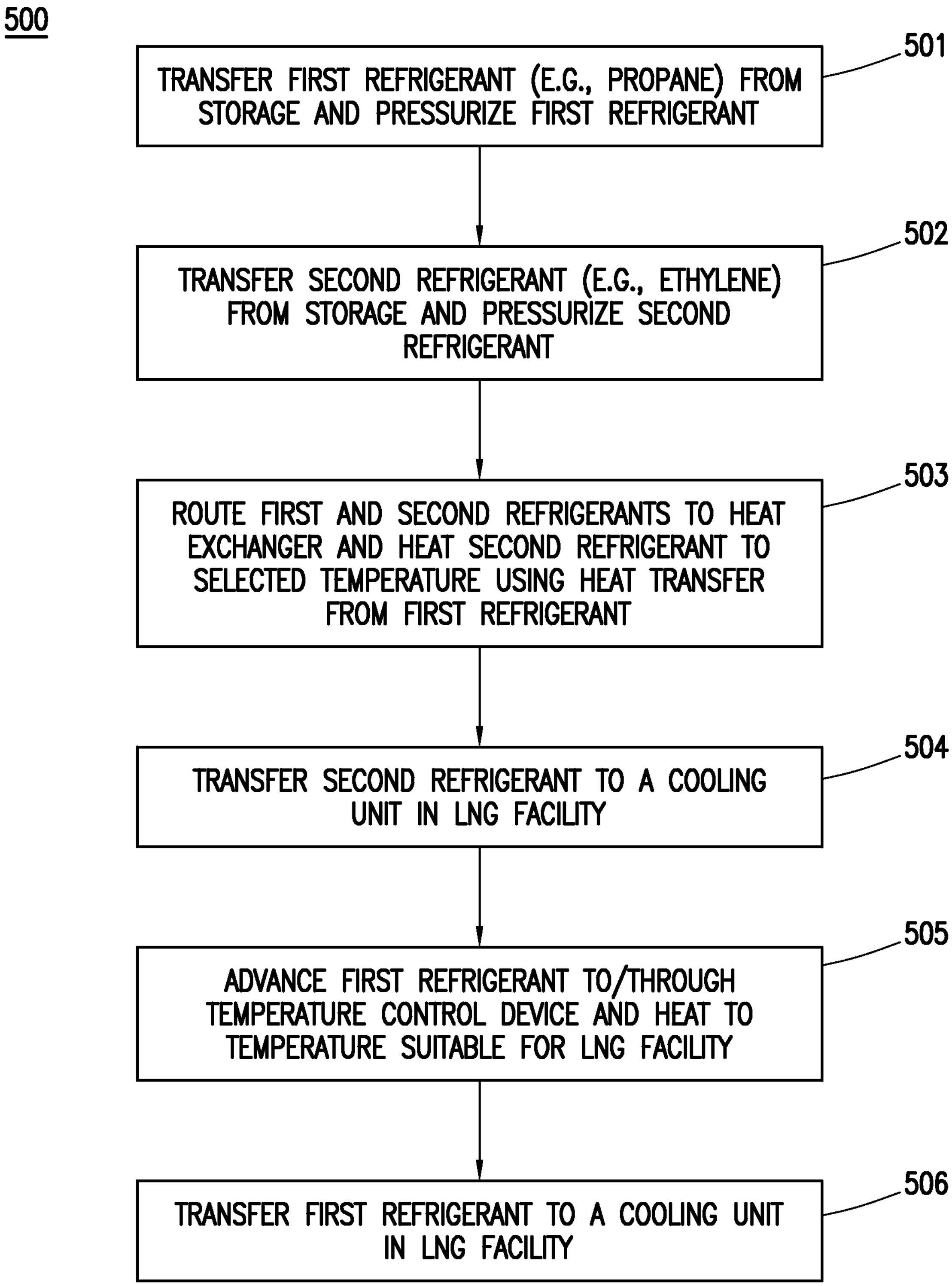
FIG. 11 is a flow diagram illustrating an embodiment of a method of supplying refrigerants to a LNG facility or other cooling system.

Referring to FIG. 11, a method 500 of supplying refrigerants to a cooling facility such as a multiple-refrigerant LNG facility is described. The method 500 may be executed by a user and/or one or more computer processing systems. The method 500 includes one or more stages 501-506. In one embodiment, the method 500 includes the execution of all of stages 501-506 in the order described. However, certain stages may be omitted, stages may be added, or the order of the stages changed.

The method 500 is described in conjunction with embodiments of the filling or supply system 400, but can be used with any suitable supply system and cooling system for which refrigerants can be supplied. Furthermore, the following description includes a first refrigerant described as propane and a second refrigerant described as ethylene. However, the method is not limited for use with these refrigerants. Any suitable refrigerants can be used, such as a first refrigerant and a second refrigerant that have different boiling points.

In the first stage 501, a first refrigerant such as propane is transferred from the storage container 402 in liquid form and pressurized via the pump 404.

In the second stage 502, a second refrigerant such as ethylene, having a lower boiling point than the first refrigerant, is transferred from the storage container 410 in liquid form and pressurized via the pump 412.

In the third stage 503, the propane and the ethylene are both routed to the heat exchanger 426. Flow of the ethylene and/or the propane through the heat exchanger 426 is controlled to control the transfer of heat from the propane to the ethylene and raise the temperature of the ethylene from the storage temperature to a selected temperature. The selected temperature may be an operating temperature of a cooling unit of a LNG facility, or some temperature selected to avoid thermal shock to the cooling unit.

In the fourth stage 504, the ethylene is transferred to the cooling unit. Subsequent to heating the ethylene using heat transfer from the propane, the ethylene temperature may be further controlled through suitable temperature control devices, such as heat exchangers or expanders. In addition, the pressure of the ethylene may be controlled using suitable pressure control devices such as the expansion valve 432.

In the fifth stage 505, the propane is routed from the heat exchanger 426 to a temperature control device or system. The temperature control device may be one or more devices or systems. The temperature and/or pressure of the propane is controlled to bring the temperature and pressure in line with operational requirements of the LNG facility, and/or to avoid thermal shock. Exemplary temperature control devices or systems include the temperature control assembly 424 and the temperature controller 456.

In the sixth stage 506, the propane is transferred from the temperature control device or system to the LNG facility. For example, the propane is transferred to a cooling unit of the LNG facility.

The method 500 may be employed to introduce the refrigerants at various temperatures and pressures, and in different phases (i.e., gas or liquid). In this way, the refrigerants can be introduced during first fill procedures or online subsequent to the first fill. In addition, at least some of the stages described above can be performed sequentially or at the same time. For example, during online filling, the ethylene and propane can be heated and transferred to the LNG facility concurrently.

An example of a first fill procedure is described as follows. In this example, a LNG facility such as shown in FIGS. 1 and 2 is initially filled with both ethylene and propane.

Ethylene is pressurized, heated and transferred to the LNG facility as vapor using the system 400. The ethylene can be transferred from storage as a vapor, or liquid ethylene can be pumped to a vaporizer, e.g., the vaporizer 464. After a desired amount of vapor is introduced to the LNG facility (e.g., 18 tons) and the LNG system is sufficiently pressurized (e.g., to about 5 barg), liquid ethylene is pressurized, heated and introduced via, e.g., the conduit 430 and optionally using the temperature control assembly 424. The liquid ethylene is introduced to the LNG at a suitable operational pressure (e.g., about 2.5 to 3 barg). The first fill of ethylene can be completed (159 liquid and 18 vapor) in about 24 to 36 hours. Subsequent online filling can be performed by pumping liquid ethylene to the LNG facility.

Propane is pressurized, heated and transferred to the LNG facility as vapor using the system 400. The propane can be transferred from storage as a vapor, such as via the boil off gas conduit 476. Alternatively, the propane can be pumped from storage as a liquid and through a vaporizer. After the LNG system is sufficiently pressurized (e.g., to about 2-3 barg), liquid propane is pressurized, heated and introduced via, e.g., the temperature control assembly 424. The liquid propane is introduced to the LNG facility, e.g., at around 11.6 barg to a maximum of around 23 barg. The first fill of propane can be completed (595 liquid and 31 vapor) in about 24 to 36 hours. Subsequent online filling can be performed by pumping liquid propane to the LNG facility.

The embodiments described provide numerous advantages. The systems described herein are a capable of providing refrigerants from liquid storage to a LNG facility or other cooling facility at a wide range of temperatures and pressures, and as vapor or liquid to avoid equipment damage due to thermal shock. The embodiments can be used to accomplish both first fill and online refilling, as well as recovering vapor from storage tanks to reduce emissions.

Temperature control embodiments provide for improved control and operational flexibility. For example, the ability to control the temperature of refrigerant streams used for first fill allows for the slow reduction of the temperature of a LNG facility to avoid thermal shock. In addition, more efficient warming is achieved relative to prior art techniques due to the cascade warming configuration used in the systems described herein, e.g., using propane to heat ethylene, glycol to heat propane, hot water to heat glycol, and gas turbine waste heat to heat hot water.

Embodiments described herein are useful for applications where space is limited and storage of refrigerants at remote locations is not practical or desirable. For example, the embodiments allow refrigerants to be stored at low pressures (e.g., atmospheric pressure), which increases safety and allows refrigerants to be stored near a cooling facility. This is advantageous, e.g., for floating applications and onshore plants where plot space constraints make pressurized storage difficult.

Generally, some of the teachings herein are reduced to an algorithm that is stored on machine-readable media. The algorithm is implemented by the computer processing system and provides operators with desired output.

In support of the teachings herein, various analysis components may be used, including digital and/or analog systems. The digital and/or analog systems may be included, for example, in the various pumping devices, flow controllers and temperature control devices and assemblies described herein. In addition, analysis components may be used for centralized controllers to control operation of the filling and supply systems described herein. The digital and/or analog systems may include components such as a processor, analog to digital converter, digital to analog converter, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles “a” or “an.” The articles are intended to mean that there are one or more of the elements. The terms “including” and “having” and their derivatives are intended to be inclusive such that there may be additional elements other than the elements listed. The term “or” when used with a list of at least two items is intended to mean any item or combination of items.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for supplying refrigerants to a floating liquefied natural gas (LNG) facility, the method comprising:
- advancing a first refrigerant from a first storage device to a heat exchanger, the first refrigerant having a first temperature;
- advancing a second refrigerant from a second storage device to the heat exchanger, the second refrigerant having a second temperature different than the first temperature;
- adjusting the second temperature based on at least a transfer of heat between the first refrigerant and the second refrigerant in the heat exchanger;

advancing the first refrigerant from the heat exchanger to a temperature control system to apply heat to the first refrigerant;

advancing the second refrigerant from the heat exchanger to an expansion valve to reduce pressure of the second refrigerant; and transferring the first refrigerant from the temperature control system and the second refrigerant from the expansion valve to cooling cycles in the floating LNG facility, wherein, the second refrigerant is introduced to the floating LNG facility, during a first-fill procedure at a different pressure than subsequent introductions of the second refrigerant to the floating LNG facility, the first-fill procedure of the second refrigerant is performed prior to operation of the floating LNG facility, and the subsequent introductions of the second refrigerant occur during the operation of the floating LNG facility.

2. The method of claim 1, wherein the first refrigerant is stored in the first storage device in liquid form at a first refrigerant pressure that is lower than a LNG facility pressure, and the second refrigerant is stored in the second storage device in liquid form at a second refrigerant pressure that is lower than the LNG facility pressure.

3. The method of claim 2, wherein the first refrigerant pressure and the second refrigerant pressure are atmospheric pressures.

4. The method of claim 1, wherein the first refrigerant has a first boiling point, the second refrigerant has a second boiling point, the first boiling point is greater than the second boiling point, and the first temperature is greater than the second temperature.

5. The method of claim 4, wherein the floating LNG facility is a cascade facility having at least a first cooling unit and a second cooling unit, wherein the transferring includes transferring the first refrigerant to the first cooling unit and transferring the second refrigerant to the second cooling unit.

6. The method of claim 5, wherein the floating LNG facility is configured to dispose a natural gas stream in the first cooling unit to cool the natural gas stream, and advance the natural gas stream from the first cooling unit to the second cooling unit to further cool the natural gas stream, the first cooling unit including a first closed-loop refrigerant cycle configured for indirect heat exchange between the first refrigerant and the natural gas stream, and the second cooling unit including a second closed-loop refrigerant cycle configured for indirect heat exchange between the second refrigerant and the natural gas stream.

7. The method of claim 5, wherein, the first refrigerant is received as a gaseous first refrigerant from at least one of the first storage device and a vaporizing device, and the gaseous first refrigerant is compressed, heated, and introduced to the first cooling unit.

8. The method of claim 5, wherein, the second refrigerant is received from the heat exchanger as a liquid second refrigerant, and the liquid second refrigerant is vaporized to form a gaseous second refrigerant and introduced to the second cooling unit.

9. The method of claim 5, wherein, the first refrigerant is a liquid first refrigerant, and the liquid first refrigerant is advanced from the heat exchanger to a temperature controller of the temperature control system, heated and introduced to the first cooling unit.

10. The method of claim 5, wherein, the second refrigerant is a liquid second refrigerant, and the second refrigerant is advanced from the heat exchanger to the second cooling unit.

11. A method to supply refrigerants to a floating liquefied natural gas (LNG) facility, the method comprising:

heating, via a temperature control system, a first refrigerant received from a heat exchanger;

reducing, via an expansion valve, pressure of a second refrigerant received from the heat exchanger; and transferring the first refrigerant and the second refrigerant to cooling cycles in the floating LNG facility during a first-fill procedure, wherein, the second refrigerant is introduced to the floating LNG facility, during a first-fill procedure at a different pressure than subsequent introductions of the second refrigerant to the floating LNG facility, the first-fill procedure of the second refrigerant is performed prior to operation of the floating LNG facility, and the subsequent introductions of the second refrigerant occur during the operation of the floating LNG facility.

12. The method of claim 11, wherein the first refrigerant is stored in a first storage device in liquid form at a first refrigerant pressure that is lower than a LNG facility pressure, and the second refrigerant is stored in a second storage device in liquid form at a second refrigerant pressure that is lower than the LNG facility pressure.

13. The method of claim 12, wherein the first refrigerant pressure and the second refrigerant pressure are atmospheric pressures.

14. The method of claim 11, wherein the first refrigerant has a first boiling point, the second refrigerant has a second boiling point, the first boiling point is greater than the second boiling point.

15. The method of claim 14, wherein, the floating LNG facility is a cascade facility having at least a first cooling unit and a second cooling unit, and the transferring includes transferring the first refrigerant to the first cooling unit and transferring the second refrigerant to the second cooling unit.

16. The method of claim 15, wherein, the first refrigerant is received as a gaseous first refrigerant, and the gaseous first refrigerant is compressed, heated, and introduced to the first cooling unit.

17. The method of claim 15, wherein, the second refrigerant is received as a liquid second refrigerant, and the liquid second refrigerant is vaporized to form a gaseous second refrigerant and introduced to the second cooling unit.

18. The method of claim 15,
wherein,
the first refrigerant is a liquid first refrigerant, and
the liquid first refrigerant is advanced from the heat exchanger to a temperature controller of the temperature control system, heated and introduced to the first cooling unit.

19. The method of claim 15,
wherein,
the second refrigerant is a liquid second refrigerant, and
the second refrigerant is advanced from the heat exchanger to the second cooling unit.

* * * * *